(12) United States Patent
Isard

(10) Patent No.: US 7,844,959 B2
(45) Date of Patent: Nov. 30, 2010

(54) RUNTIME OPTIMIZATION OF DISTRIBUTED EXECUTION GRAPH

(75) Inventor: Michael A. Isard, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1033 days.

(21) Appl. No.: 11/537,514

(22) Filed: Sep. 29, 2006

(65) Prior Publication Data

US 2008/0098375 A1 Apr. 24, 2008

(51) Int. Cl.
*G06F 9/45* (2006.01)
*G06F 9/46* (2006.01)
*G06F 15/76* (2006.01)

(52) U.S. Cl. .................. 717/149; 717/156; 718/100; 712/7

(58) Field of Classification Search .............. 717/149, 717/156; 718/100; 712/7
See application file for complete search history.

(56) References Cited

U.S. PATENT DOCUMENTS

| | | | |
|---|---|---|---|
| 5,201,046 A | | 4/1993 | Goldberg |
| 5,410,696 A | | 4/1995 | Seki |
| 5,414,849 A | | 5/1995 | Yamamoto |
| 5,680,530 A | | 10/1997 | Selfridge |
| 5,999,729 A | | 12/1999 | Tabloski, Jr. |
| 6,104,962 A | * | 8/2000 | Sastry .................... 700/86 |
| 6,154,736 A | * | 11/2000 | Chickering et al. .......... 706/59 |
| 6,237,021 B1 | | 5/2001 | Drummond |
| 6,253,372 B1 | | 6/2001 | Komatsu |
| 6,282,708 B1 | | 8/2001 | Augusteijn |
| 6,330,583 B1 | | 12/2001 | Reiffin |
| 6,378,066 B1 | | 4/2002 | Lewis |
| 6,393,458 B1 | | 5/2002 | Gigliotti |
| 6,430,590 B1 | | 8/2002 | Fischer |
| 6,442,663 B1 | * | 8/2002 | Sun et al. .................... 711/202 |

(Continued)

FOREIGN PATENT DOCUMENTS

WO WO9930230 6/1999

(Continued)

OTHER PUBLICATIONS

Fan Chan et al., "Visual Programming support for graph-oriented parallel/distributed processing", Published online Jul. 29, 2005 in Wiley InterScience (www.interscience.wiley.com). DOI: 10.1002/spe.676; Software-Practice and Experience; Softw. Pract. Exper. 2005; 35:1409-1439.*

(Continued)

*Primary Examiner*—Wei Y Zhen
*Assistant Examiner*—Chih-Ching Chow
(74) *Attorney, Agent, or Firm*—Vierra Magen Marcus & DeNiro LLP

(57) ABSTRACT

A general purpose high-performance distributed execution engine for coarse-grained data-parallel applications is proposed that allows developers to easily create large-scale distributed applications without requiring them to master concurrency techniques beyond being able to draw a graph of the data-dependencies of their algorithms. Based on the graph, a job manager intelligently distributes the work load so that the resources of the execution engine are used efficiently. During runtime, the job manager (or other entity) can automatically modify the graph to improve efficiency. The modifications are based on runtime information, topology of the distributed execution engine, and/or the distributed application represented by the graph.

16 Claims, 23 Drawing Sheets

U.S. PATENT DOCUMENTS

| | | | |
|---|---|---|---|
| 6,505,345 | B1 | 1/2003 | Chen |
| 6,662,354 | B1 | 12/2003 | Krablin |
| 6,665,863 | B1 | 12/2003 | Lord |
| 7,028,167 | B2 | 4/2006 | Soltis, Jr. |
| 7,047,232 | B1 | 5/2006 | Serrano |
| 7,292,585 | B1 * | 11/2007 | Slaughter et al. ............ 370/400 |
| 7,509,632 | B2 | 3/2009 | Boger |
| 7,644,142 | B2 * | 1/2010 | Chen et al. ................. 709/220 |
| 2002/0162089 | A1 | 10/2002 | Lewis |
| 2003/0088755 | A1 | 5/2003 | Gudmunson |
| 2003/0135621 | A1 | 7/2003 | Romagnoli |
| 2003/0177240 | A1 | 9/2003 | Gulko |
| 2003/0195938 | A1 | 10/2003 | Howard |
| 2004/0054992 | A1 | 3/2004 | Nair |
| 2004/0078780 | A1 * | 4/2004 | Dutt et al. ................... 717/106 |
| 2004/0216096 | A1 | 10/2004 | Messer |
| 2004/0244006 | A1 | 12/2004 | Kaufman |
| 2005/0034112 | A1 | 2/2005 | Stanfill |
| 2005/0039159 | A1 | 2/2005 | Pan |
| 2005/0188180 | A1 | 8/2005 | Illmann |
| 2005/0198469 | A1 | 9/2005 | Mitchell |
| 2005/0273773 | A1 | 12/2005 | Gold |
| 2005/0278152 | A1 | 12/2005 | Blaszczak |
| 2006/0026571 | A1 | 2/2006 | Cabillic |
| 2006/0143611 | A1 * | 6/2006 | Sadiq ......................... 718/100 |
| 2008/0079724 | A1 | 4/2008 | Isard |
| 2008/0082644 | A1 | 4/2008 | Isard |

FOREIGN PATENT DOCUMENTS

| | | |
|---|---|---|
| WO | WO0211344 | 2/2002 |

OTHER PUBLICATIONS

Baraglia, et al., "Resource Management Systems: Scheduling of Resource-Intensive Multi-Component Applications," http://www.grid.it/Groups/1068825896233/1106577425414/DeliverableRisorse.pdf, Jan. 23, 2004.

Bal, et al., "ORCA: A Language for Parallel Programming of Distributed Systems," http://ieeexplore.ieee.org/iel1/32/3545/00126768.pdf?tp=&arnumber=126768&isnumber=3545, Mar. 1992.

Blochinger, et al., "Visualizing Structural Properties of Irregular Parallel Computations," http://delivery.acm.org/10.1145/1060000/1056036/p125-blochinger.pdf?key1=1056036&key2=2417831511&coll=Portal&dl=GUIDE&CFID=74220359&CFTOKEN=92790055, 2005.

Dean, et al., "MapReduce: Simplified Data Processing on Large Clusters," http://labs.google.com/papers/mapreduce-osdi04.pdf, 2004, pp. 1-13.

Park, et al., "Design and implementation of the parallel multimedia file system based on message distribution," http://portal.acm.org/citation.cfm?doid=354384.376325, 2000, pp. 422-425.

Bove, et al., "Cheops: A Reconfigurable Data-Flow System for Video Processing," http://web.media.mit.edu/~wad/cheops_CSVT/cheops.html, 1995, 21 pgs.

Gerlach, et al., "DPS—Dynamic Parallel Schedules," http://dps.epfl.ch/dpsdps.pdf, 2003, 10 pgs.

Fritzson, "A Task Merging Technique for Parallelization of Modelica Models," http://www.modelica.org/events/Conference2005/online_proceedings/Session1/Session1c4.pdf, Mar. 7-8, 2005, pp. 123-128.

Upgrade: A Framework for Building Graph-Based Interactive Tools http://ai1.inf.uni-bayreuth.de/apache/publications/westfechtel/2002/GRABATS%202002.pdf.

Harrold, et al., "Aristotle: A System for Research on and Development of Program Analysis Based Tools," http://www.cc.gatech.edu/aristotle/Publications/Papers/aristotle.ps, Mar. 1997, 13 pgs.

Akinde, et al., "Constructing GPSJ View Graphs," http://ftp.informatik.rwth-aachen.de/Publications/CEUR-WS/Vol-19/paper8.pdf, 1999, 12 pgs.

Liechti, et al., "Structured graph format: XML metadata for describing Web site structure," http://xml.coverpages.org//sgfWWW7.html, 13 pgs, Computer Networks and ISDN Systems, 1998.

Babaoglu, Ozalp et al. Mapping Parallel Computations onto Distributed Systems in paralex. Department of Mathematics, University of Bologna [online], May 1991 [retrieved on Feb. 25, 2010]. Retrieved from the Internet: <URL: http://ieeexplore.ieee.org/stamp/stamp.jsp?arnumber+00257368>.

Babaoglu, "Paralex: An Environment for Parallel Programming in Distributed Systems," Department of Mathematics, University of Bologna, Italy, Jul. 2004.

* cited by examiner

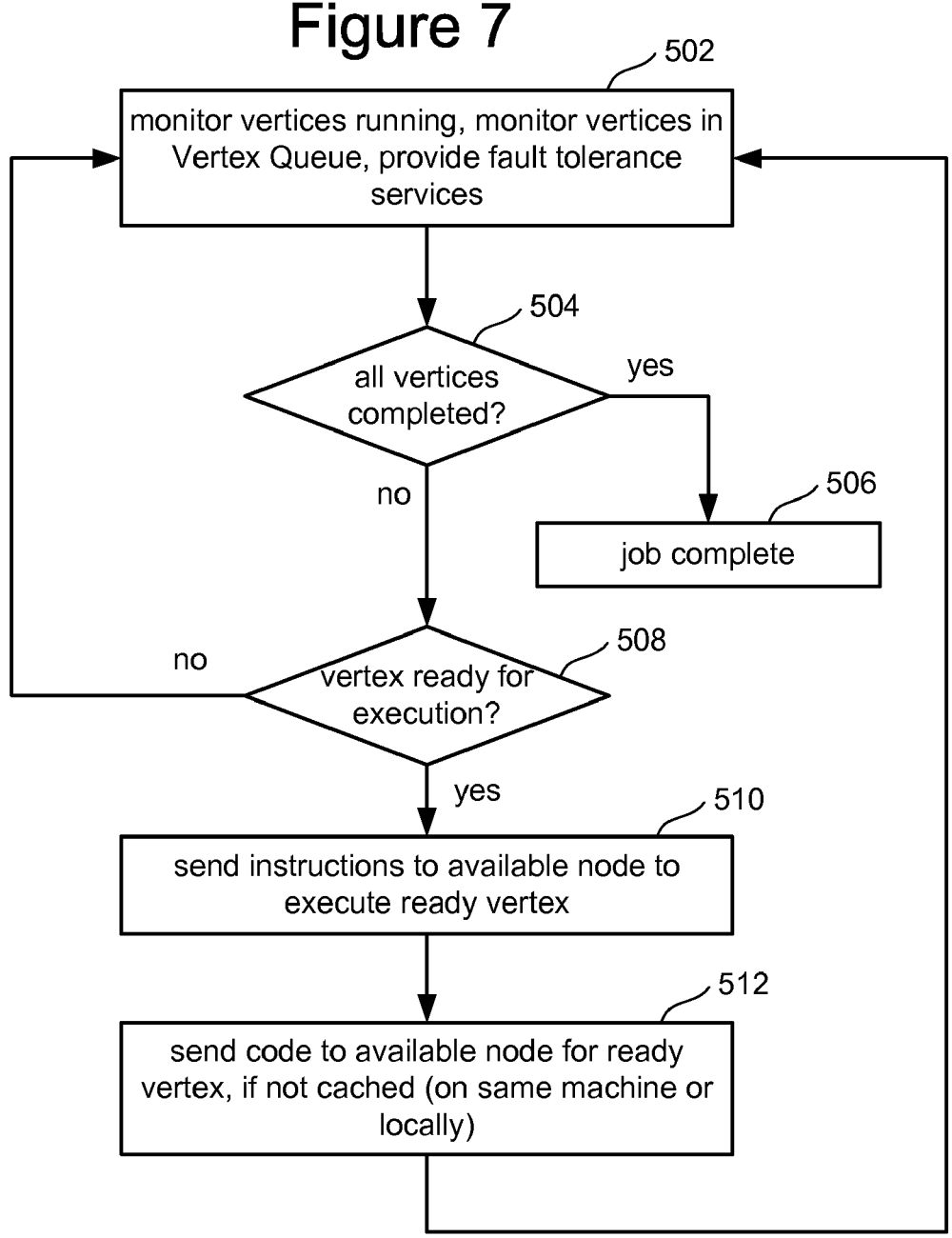

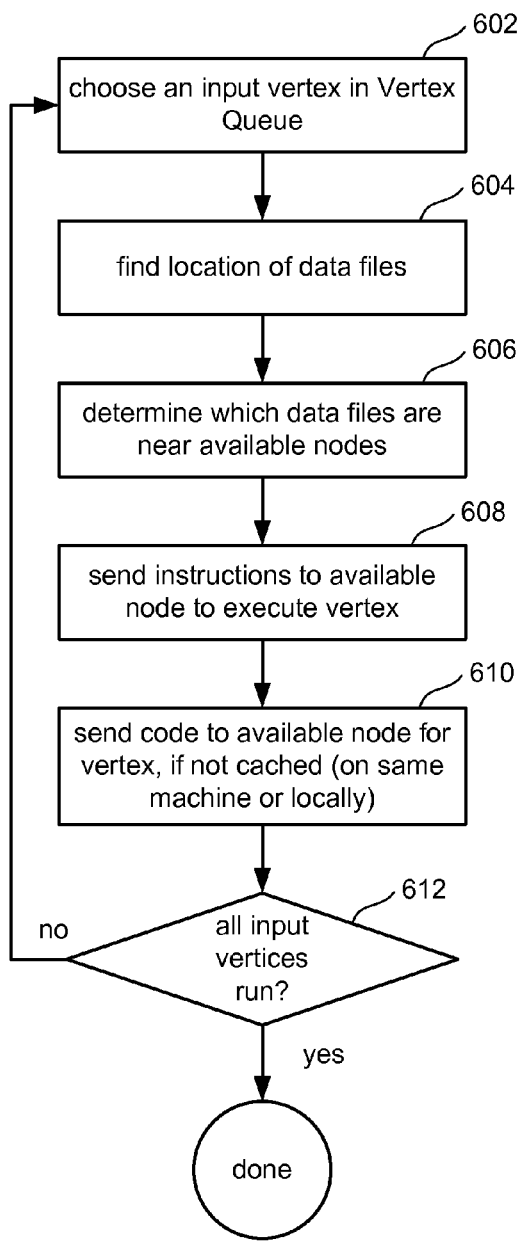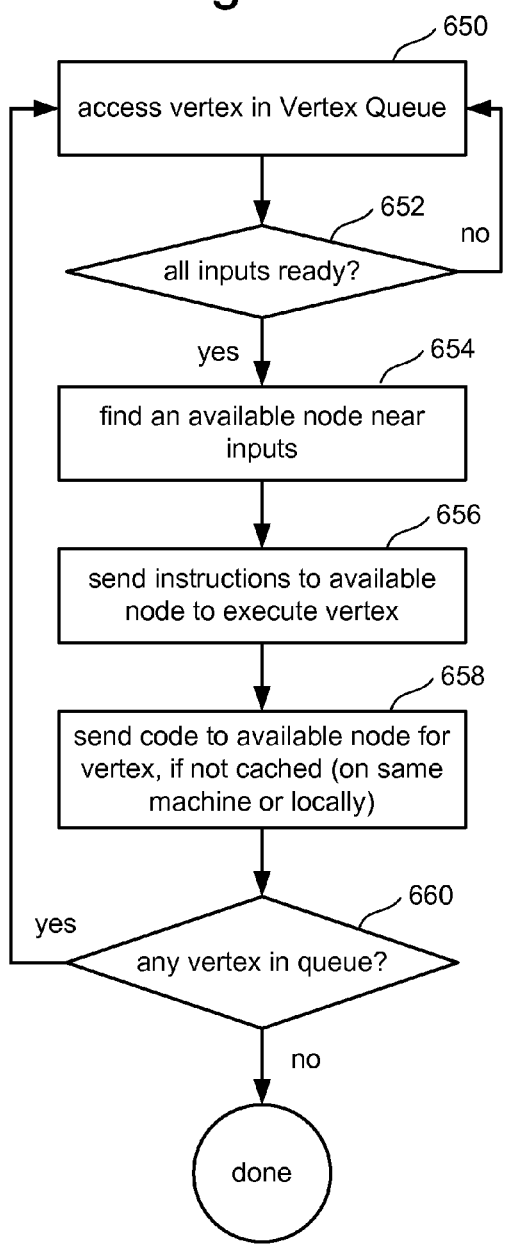

```
Graph Builder Data Structure
    Graph;
    Inputs[];
    Outputs[].
Graph
    Vertices[];
    Edges[].
Graph Vertex
    UID
    Program Description
Graph Edge
    UID
    Source  UID
    Destination UID
```
Figure 12
T=Create ("m") 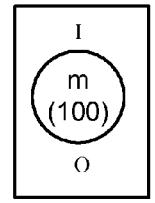
Figure 13
Figure 14
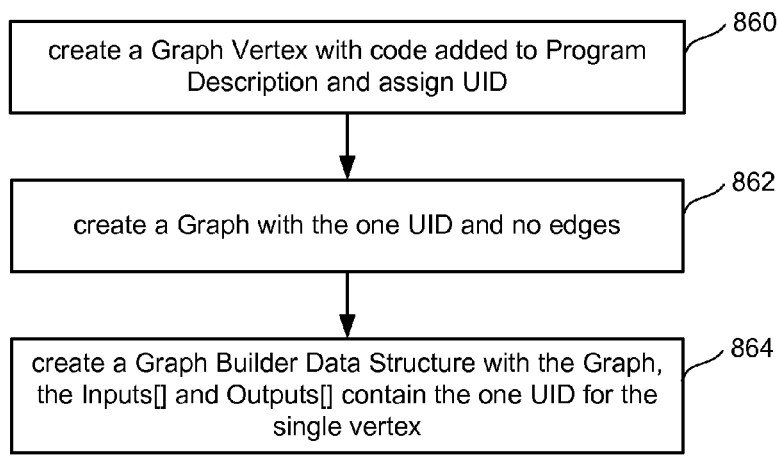

Q=T^n $Y = Q \geq W$ $Z1 = X \geq Q$ $Y = Q >> W$ $Z2 = X >> Q$

```
#include <dryadjointapp.h>
#include <recordsort.h>
struct U32 \{ UInt32 v; \}; typedef PackedRecordBundle<U32> B32; static B32 b32;
struct U64 \{ UInt64 v; \}; typedef PackedRecordBundle<U64> B64; static B64 b64;
```

1280
```
class SumVertex : public DryadVertexProgram \{
 public:
  SumVertex() \{ SetNumberOfParserFactories(2);
    SetParserFactory(0, b32.GetParserFactory());
    SetParserFactory(1, b64.GetParserFactory()); \} void Main(WorkQueue* wQ, UInt32 nIn, RChannelReader** inChannel,
        UInt32 nOut, RChannelWriter** outChannel) \{
    B32::Reader input0(inChannel[0]); B64::Reader input1(inChannel[1]);
    B64::Writer output(&b64, outChannel[0]);
    while (input0.Advance() && input1.Advance()) \{
      UInt64 sum = input0->v + input1->v; output.MakeValid(); output->v = sum; \} \} \};
static StdTypedVertexFactory<SumVertex> s_sum("Sum");
```

1282
```
int Comp64(const void* a, const void* b) \{
  UInt64 aa = *(UInt64*)a, bb = *(UInt64*)b;
  return ((aa<bb)?-1:((aa==bb)?0:1)); \}
static StdRecordInternalSortFactory s_iSort("IS", &b64, Comp64);
static StdRecordMergeSortFactory s_mSort("MS", &b64, Comp64);
```

1284
```
int __cdecl DryadJobManagerMain(int argc, char* argv[]) \{
  DryadJointApp app(&argc, &argv);
```

1286
```
  GraphVertex sum = s_sum.Make(), iSort = s_iSort.Make(), mSort = s_mSort.Make();
  UInt32 nPartitions = app.GetInput(0)->GetSize();
  GraphBuilder iSorts = (sum >= iSort)^nPartitions;
  GraphBuilder G = ((app.GetInput(0) >= iSorts) || (app.GetInput(1) >= iSorts)) >=
    mSort >= app.GetOutput(0);
```

1288
```
  return app.Run(G); \}
```

RUNTIME OPTIMIZATION OF DISTRIBUTED EXECUTION GRAPH

This application is related to the following U.S. patent applications: "Distributed Parallel Computing," Isard, Birrell, Budiu, Yu and Fetterly, filed the same day as the present application, Ser. No. 11/537,506; and "Description Language For Structured Graphs," Isard, Birrell and Yu, filed the same day as the present application, Ser. No. 11/537,529. The two above listed patent applications are incorporated herein by reference in their entirety.

BACKGROUND

Traditionally, parallel processing refers to the concept of speeding-up the execution of a program by dividing the program into multiple fragments that can execute concurrently, each on its own processor. A program being executed across n processors might execute n times faster than it would using a single processor. The terms concurrently and parallel are used to refer to the situation where the period for executing two or more processes overlap in time, even if they start and stop at different times. Most computers have just one processor, but some models have several. With single or multiple processor computers, it is possible to perform parallel processing by connecting multiple computers in a network and distributing portions of the program to different computers on the network.

In practice, however, it is often difficult to divide a program in such a way that separate processors can execute different portions of a program without interfering with each other. One idea to facilitate the use of parallel processing is for the developer to use a graph that defines how the various portions of a job will be executed in parallel by the execution engine. The graph can be used by the execution engine to manage the parallel processing. However, a graph created by a software developer may not make most efficient use of the execution engine because the developer may not be aware of the topology of the execution engine or other variables that effect performance.

SUMMARY

The technology described herein pertains to a general purpose high-performance distributed execution engine for parallel processing of applications. A developer creates code that defines a directed acyclic graph and code for implementing vertices of the graph. A job manager uses the code that defines the graph and a library to build the defined graph. Based on the graph, the job manager manages the distribution of the various code for implementing vertices of the graph to the various nodes of the distributed execution engine. During runtime, the job manager (or other enmtity) can automatically modify the graph to improve efficiency. The modifications are based on runtime information, topology of the distributed execution engine, and/or the distributed application represented by the graph.

One embodiment includes assigning a first set of code corresponding to vertices of a graph to various nodes of a distributed parallel processing engine based on the graph, automatically modifying the graph based on executing the first set of code, and assigning a second set of code corresponding to vertices of the graph to various nodes of the distributed parallel processing engine based on the modified graph. The first set of code and the second set of code are part of the same parallel processing job defined by the graph. Another embodiment includes accessing a representation of a directed acyclic graph defining a parallel processing job to be run on a distributed execution engine, automatically modifying the graph during runtime of the parallel processing job based on runtime information of the parallel processing job, and assigning code corresponding to vertices of the graph to various nodes of the distributed parallel processing engine based on the graph.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is a flow chart describing one embodiment of a process for managing vertices.

FIG. 8 is a flow chart describing one embodiment of a process for managing vertices.

FIG. 9 is a flow chart describing one embodiment of a process for managing vertices.

FIG. 12 depicts a block diagram of a data structure for a graph.

FIG. 13 depicts a graph with one vertex.

FIG. 14 is a flow chart describing one embodiment of a process for creating a graph.

FIG. 26 depicts an example application.

DETAILED DESCRIPTION

The technology described herein pertains to a general purpose high-performance distributed execution engine for parallel processing of applications. A developer creates code that defines a directed acyclic graph and code for implementing vertices of the graph. A job manager uses the code that defines the graph and a library to build the defined graph. Based on the graph, the job manager manages the distribution of the various code for implementing vertices of the graph to the various nodes of the distributed execution engine. During runtime, the job manager (or other entity) can automatically modify the graph to improve efficiency. The modifications are based on runtime information, topology of the distributed execution engine, and/or the distributed application represented by the graph.

Figure 1:
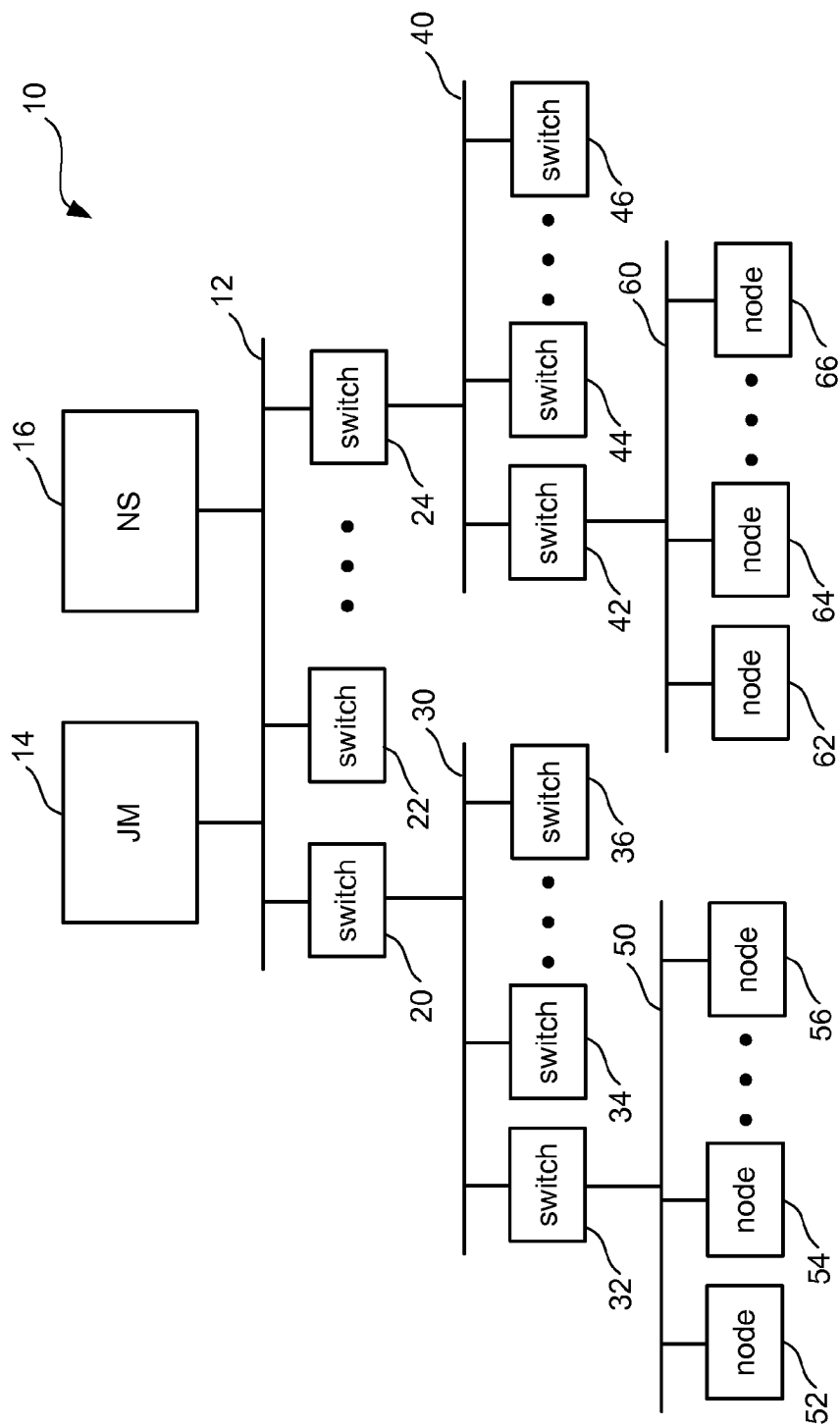
FIG. 1 is a block diagram of one embodiment of a distributed execution engine.

FIG. 1 is a block diagram of one embodiment of a suitable execution engine that is implemented as a tree-structure network 10 having various sub-networks within the tree-structure connected via switches. For example, sub-network 12 includes Job Manager 14 and Name Server 16. Sub-network 12 also includes a set of switches 20, 22, . . . , 24. Each switch connects sub-network 12 with a different sub-network. For example, switch 20 is connected to sub-network 30 and switch 24 is connected to sub-network 40. Sub-network 30 includes a set of switches 32, 34, . . . , 36. Sub-network 40 includes a set of switches 42, 44, . . . , 46. Switch 32 is connected to sub-network 50. Switch 42 is connected to sub-network 60. Sub-network 50 includes a set of computing machines 52, 54, . . . , 56. Sub-network 60 includes a set of computing machines 62, 64, . . . , 66. Computing machines 52, 54, . . . , 56 and 62, 64, . . . , 66 (as well as other computing machines at the bottom levels of the hierarchy of the tree-structured network) make up the cluster of machines that form the distributed execution engine. Although FIG. 1 shows three levels of hierarchy, more or less than three levels can be used. In another embodiment the network may not be tree-structured, for example it could be arranged as a hypercube. In this case "close" could mean within a fixed number of hypercube edges, rather than within a particular sub-network.

A parallel processing job (hereinafter referred to as a "job") is coordinated by Job Manager 14, which is a process implemented on a dedicated computing machine or on one of the computing machines in the cluster. Job manager 14 contains the application-specific code to construct the job's graph along with library code which implements the vertex scheduling feature described herein. All channel data is sent directly between vertices and, thus, Job Manager 14 is only responsible for control decisions and is not a bottleneck for any data transfers. Name Server 16 is used to report the names (or other identification information such as IP Addresses) and position in the network of all of the computing machines in the cluster. There is a simple daemon running on each computing machine in the cluster which is responsible for creating processes on behalf of Job Manager 14.

Figure 2:
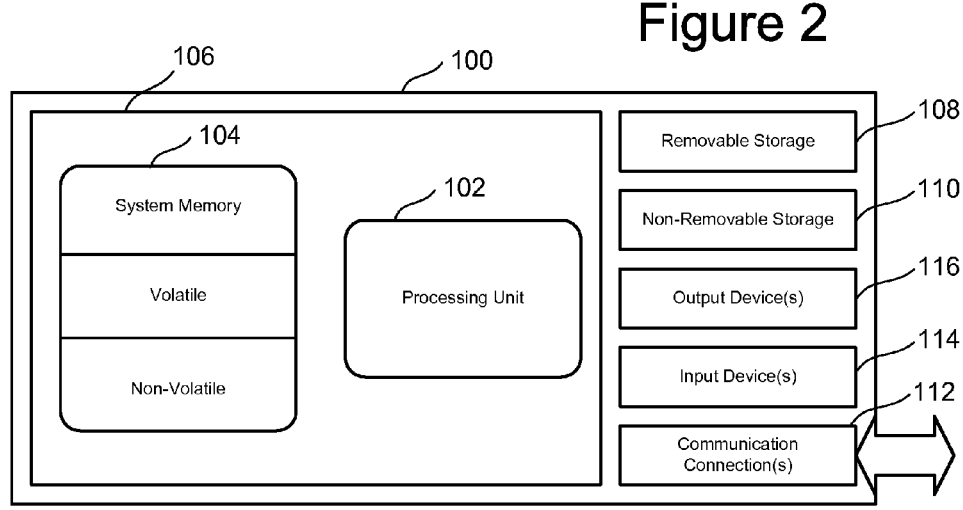
FIG. 2 is a block diagram of a computing machine that can be used to implement one embodiment of the nodes depicted in FIG. 1.

FIG. 2 depicts an exemplary computing device 100 for implementing the various computing machines of the cluster (e.g., machines 52, 54, . . . , 56 and 62, 64, . . . , 66), Job Manager 14 and/or Name Server 16. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. Processing unit 102 may be a single core, dual core (include two dual core Opteron processors) or other form of multiple core processing unit. This most basic configuration is illustrated in FIG. 2 by line 106.

Additionally, device 100 may also have additional features/functionality. For example, device 100 may also include additional storage (removable and/or non-removable) including, but not limited to, magnetic disk, optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer (or processor) readable storage media. Such media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100. In one embodiment, the system runs Windows Server 2003; however, other operating systems can be used.

Device 100 may also contain communications connection(s) 112 that allow the device to communicate with other devices via a wired or wireless network. Examples of communications connections include network cards for LAN connections, wireless networking cards, modems, etc.

Device 100 may also have input device(s) 114 such as keyboard, mouse, pen, voice input device, touch input device, etc. Output device(s) 116 such as a display/monitor, speakers, printer, etc. may also be included. All these devices (input, output, communication and storage) are in communication with the processor.

The technology described herein can be implemented using hardware, software, or a combination of both hardware and software. The software used is stored on one or more of the processor readable storage devices described above to program one or more of the processors to perform the functions described herein. In alternative embodiments, some or all of the software can be replaced by dedicated hardware including custom integrated circuits, gate arrays, FPGAs, PLDs, and special purpose computers.

Figure 3:
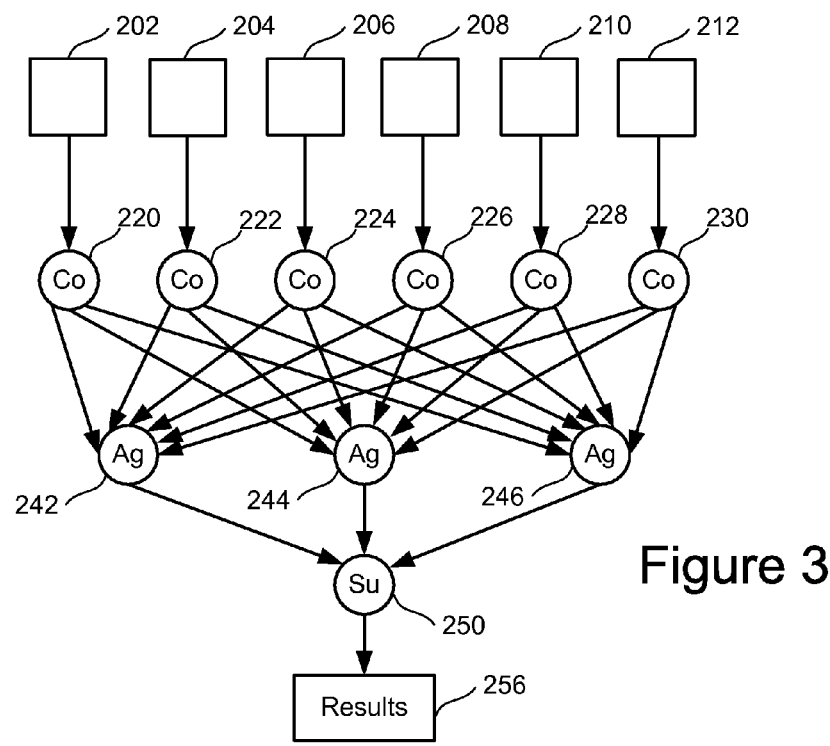
FIG. 3 is an example of a directed acyclic graph.

As described above, a developer can create code that defines a directed acyclic graph. Job Manager 14 will build that graph and manage the distribution of the code implementing vertices of that graph to the various nodes of the distributed execution engine. FIG. 3 provides one example of such a graph which represents a system that reads query logs gathered by an Internet search service, extracts the query strings, and builds a histogram of query frequencies sorted by frequency.

In some embodiments, a job's external input and output files are represented as vertices in the graph even though they do not execute any program. Typically, for a large job, a single logical "input" is split into multiple partitions which are distributed across the system as separate files. Each of these partitions can be represented as a distinct input vertex. In some embodiments, there is a graph constructor which takes the name of a distributed file and returns a graph made from a sequence of its partitions. The application will interrogate its input graph to read the number of partitions at runtime in order to generate the appropriate replicated graph. For example, FIG. 3 shows six partitions or files 202, 204, 206, 208, 210 and 212 of the log created by the Internet search service.

The first level of the hierarchy of the graph of FIG. 3 includes code (Co) for implementing vertices 220, 222, 224, 226, 228 and 230. The (Co) vertex reads its part of the log files, parses the data to extract the query strings, sorts the query string based on a hash of the query string, and accumulates the total counts for each query string. Although eight vertices are shown (220, 222, . . . 230), more or less than eight vertices can be used. In one embodiment, there will be one vertex at this level for each partition of the log. Each of the vertices will output a set of hashes representing the query strings and a total count for each hash. This information will then be sent to an appropriate aggregator (Ag) vertex, depending on the hash.

FIG. 3 shows three vertices 242, 244 and 246 implementing the aggregator (Ag). The potential set of queries will be broken up into three buckets, with one subset of hashes being sent to aggregator 242, a second subset of hashes being sent to aggregator 244, and a third subset of hashes being sent to aggregator 246. In some implementations, there will be more or less than three aggregators. Each of the vertices 220-230 will be in communication with all of the aggregators to send data to the appropriate aggregator based on the hash. The aggregators 242, 244 and 246 will aggregate all of the counts for each query based on data received from vertices 220-230. Each of the aggregators 242, 244 and 246 will report its data to (Su) vertex 250, which will combine the sums for all of these various queries and store those sums in results file 256. As can be seen, vertices 220-230 access data in parallel and can be executed in parallel. Similarly, aggregators 242-246 can also be executed in parallel. Thus, Job Manager 14 will distribute the vertices to maximize efficiency for the system.

In one embodiment, a job utilizing the technology described herein is programmed on two levels of abstraction. At a first level, the overall structure of the job is determined by the communication flow. This communication flow is the directed acyclic graph where each vertex is a program and edges represent data channels. It is the logical computation graph which is automatically mapped onto physical resources by the runtime. The remainder of the application (the second level of abstraction) is specified by writing the programs which implement the vertices.

Figure 4:
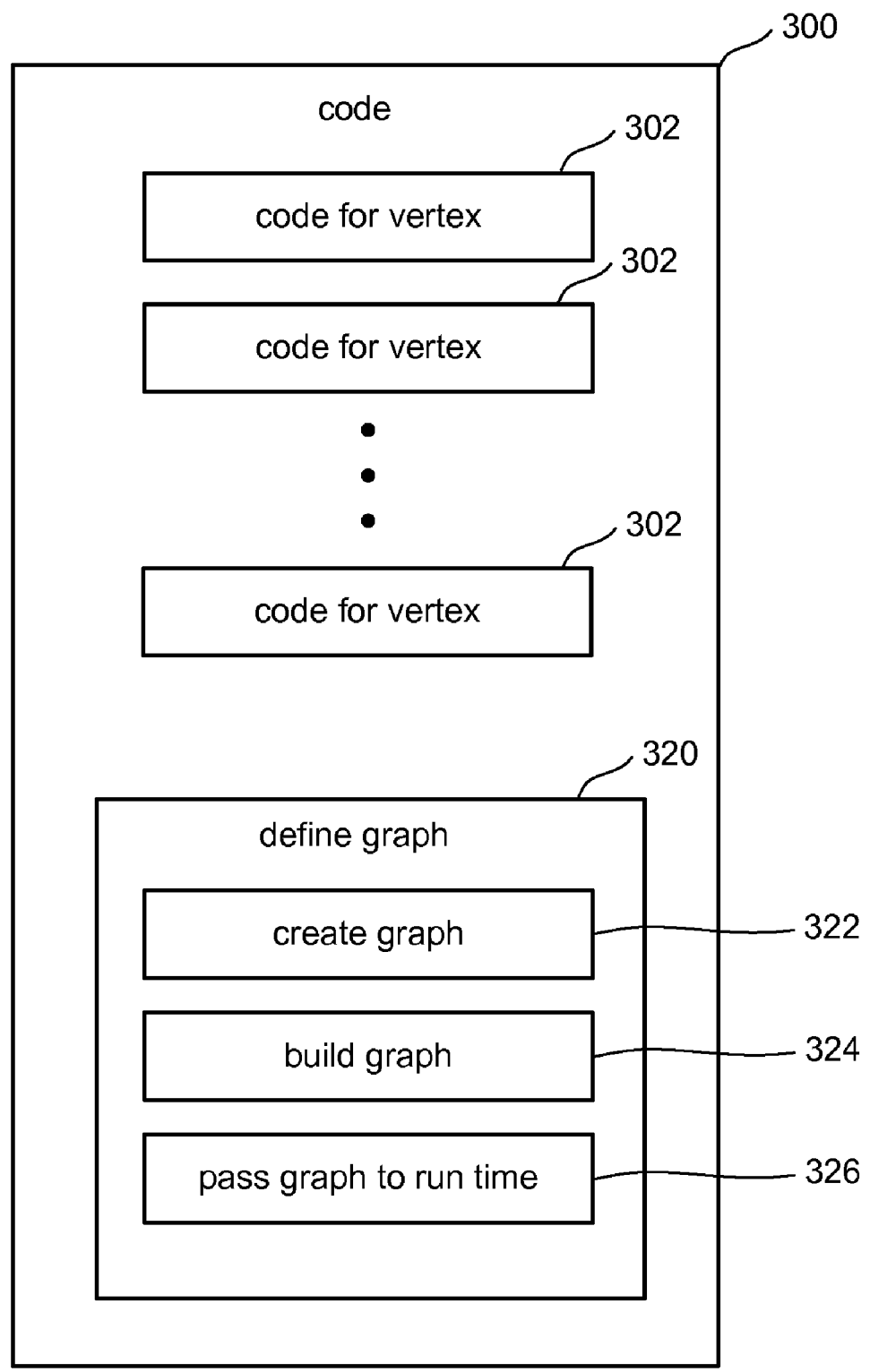
FIG. 4 is a block diagram of code to be executed by a distributed execution engine.

FIG. 4 is a block diagram depicting details of the code for a parallel processing job. Code 300 includes modules of code 302 which define the code for the vertices of the graph. It is possible that a graph may have thousands of vertices but maybe only five (or a different number of) different sets of code such that those five (or a different number of) sets of code are replicated many times for the various vertices. In one embodiment, each module of code 302 is single threaded. In other embodiments, the modules of code can be multi-threaded. Code 300 also includes code 320 for defining a graph. In one embodiment, code 320 includes code 322 for creating a graph, code 324 for building the graph (e.g., adding additional vertices and edges), and code 326 for passing the graph to the runtime engine.

Every vertex program 302 deals with its input and output through the channel abstraction. As far as the body of programs is concerned, channels transport objects. This ensures that the same program is able to consume its input either from disk or when connected to a shared memory channel—the last case avoids serialization/deserialization overhead by passing the pointers to the objects directly between producer and consumer. In order to use a data type with a vertex, the application writer must supply a factory (which knows how to allocate for the item), serializer and deserializer. For convenience, a "bundle" class is provided which holds these objects for a given data type. Standard types such as lines of UTF 8-encoded text have predefined bundles and helper classes are provided to make it easy to define new bundles. Any existing C++ class can be wrapped by a templated bundle class as long as it implements methods to deserialize and serialize its state using a supplied reader/writer interface. In the common special case of a fixed-length struct with no padding the helper libraries will automatically construct the entire bundle. In other embodiments, other schemes can be used.

Channels may contain "marker" items as well as data items. These marker items are currently used to communicate error information. For example a distributed file system may be able to skip over a subset of unavailable data from a large file and this will be reported to the vertex which may choose to abort or continue depending on the semantics of the application. These markers may also be useful for debugging and monitoring, for example to insert timestamp markers interspersed with channel data.

The base class for vertex programs 302 supplies methods for reading any initialization parameters which were set during graph construction and transmitted as part of the vertex invocation. These include a list of string arguments and an opaque buffer into which the program may serialize arbitrary data. When a vertex program is first started but before any channels are opened, the runtime calls a virtual initialization method on the base class. This method receives arguments describing the number of input and output channels connected to it. There is currently no type checking for channels and the vertex must know the types of the data which it is expected to read and write on each channel. If these types are not known statically and cannot be inferred from the number of connections, the invocation parameters can be used to resolve the question.

Data bundles are then used to set the required serializers and deserializers based on the known types. The input and output channels are opened before the vertex starts. Any error at this stage causes the vertex to report the failure and exit. This will trigger Job Manager 14 to try to recreate the missing input. In other embodiments, other schemes can be used. Each channel is associated with a single bundle so every item on the channel must have the same type. However, a union type could be used to provide the illusion of heterogeneous inputs or outputs.

When all of the channels are opened, the vertex Main routine is called and passed channel readers and writers for all its inputs and outputs respectively. The readers and writers have a blocking interface to read or write the next item which suffices for most simple applications. There is a method on the base class for inputting status which can be read by the monitoring system, and the progress of channels is automatically monitored. An error reporting interface allows that vertex to communicate a formatted string along with any additional application-defined metadata. The vertex may exit before reading all of its inputs. A process which contains a long pipeline of vertices connected via shared memory channels and ending, for example, with a head vertex will propagate the early termination of head all the way back to the start of the pipeline and exit without reading any unused portion of its inputs. In other embodiments, other schemes can be used.

Figure 5:
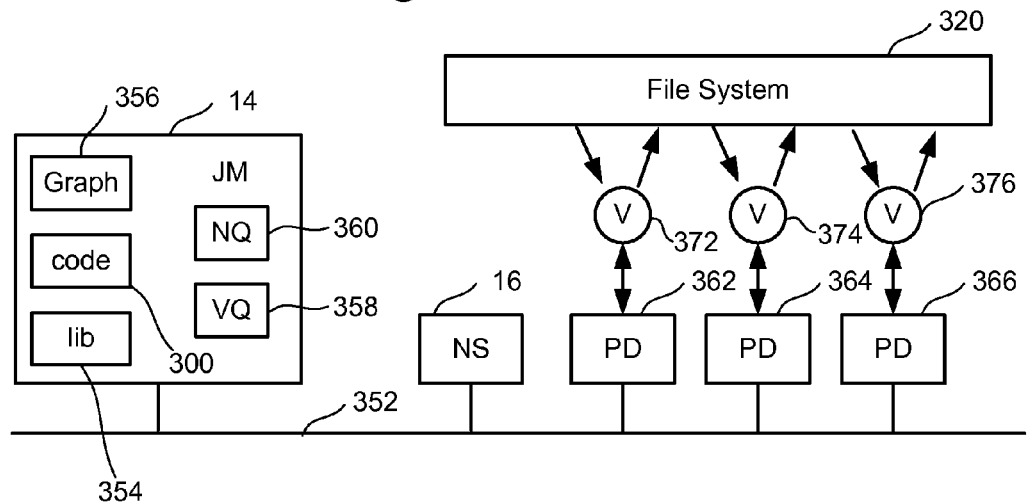
FIG. 5 is a logical view of the system depicted in FIG. 1.

FIG. 5 provides a logical view of the system depicted in FIG. 1 and how that system makes use of code 300. FIG. 5 shows Job Manager 14 connected to network system 352, which can be the network 10 of FIG. 1. Also connected to network system 352 is Name Service 316 and a set of computing machines 362, 364 and 366. Although FIG. 5 only shows three computing machines, it is possible to have less than three computing machines or more than three computing machines. In many embodiments there could be thousands of computing machines. Each computing machine has a process daemon (PD) running. Job Manager 14 will cause the various process daemons to run various vertices (e.g., vertices 372, 374, 376), which are in communication with the distributed file system 320. Job Manager 14 includes code 300, library 354, graph 356, Vertex Queue 358, and Node Queue 360.

Library 354 provides a set of code to enable Job Manager 14 to create a graph, build the graph, and execute the graph across the distributed execution engine. In one embodiment, library 354 can be embedded in C++ using a mixture of method calls and operator overloading. Library 354 defines a C++ base class from which all vertex programs inherit. Each such program has a textural name (which is unique within an application) and a static "factory" which knows how to construct it. A graph vertex is created by calling the appropriate static program factory. Any required vertex-specific parameter can be set at this point by calling methods on the program object. The parameters are then marshaled along with the unique vertex name (referred to herein as a unique identification-UID) for form a simple closure which can be sent to a remote process or execution. Every vertex is placed in a stage to simplify job management. In a large job, all the vertices in a level of hierarchy of the graph might live in the same stage; however, this is not required. In other embodiments, other schemes can be used.

The first time a vertex is executed on a computer, its binary is sent from the Job Manager 14 to the appropriate process daemon (PD). The vertex can be subsequently executed from a cache. Job Manager 14 can communicate with the remote vertices, monitor the state of the computation, monitor how much data has been read, and monitor how much data has been written on its channels. Legacy executables can be supported as vertex processes.

Job Manager 14 keeps track of the state and history of each vertex in the graph. A vertex may be executed multiple times over the length of the job due to failures, and certain policies for fault tolerance. Each execution of the vertex has a version number and a corresponding execution record which contains the state of the execution and the versions of the predecessor vertices from which its inputs are derived. Each execution names its file-based output channel uniquely using its version number to avoid conflicts when multiple versions execute simultaneously. If the entire job completes successfully, then each vertex selects one of its successful executions and renames the output files to their correct final forms.

When all of a vertex's input channels become ready, a new execution record is created for the vertex in the Ready state and gets placed in Vertex Queue 358. A disk based channel is considered to be ready when the entire file is present. A channel which is a TCP pipe or shared memory FIFO is ready when the predecessor vertex has at least one execution record in the Running state.

Each of the vertex's channels may specify a "hard constraint" or a "preference" listing the set of computing machines on which it would like to run. The constraints are attached to the execution record when it is added to Vertex Queue 358 and they allow the application writer to require that a vertex be collocated with a large input file, and in general that the Job Manager 14 preferentially run computations close to their data.

When a Ready execution record is paired with an available computer it transitions to the Running state (which may trigger vertices connected to its parent via pipes or FIFOs to create new Ready records). While an execution is in the Running state, Job Manager 14 receives periodic status updates from the vertex. On successful completion, the execution record enters the Completed state. If the vertex execution fails, the record enters the Failed state, which may cause failure to propagate to other vertices executing in the system. A vertex that has failed will be restarted according to a fault tolerance policy. If every vertex simultaneously has at least one Completed execution record, then the job is deemed to have completed successfully. If any vertex is reincarnated more than a set number of times, the entire job has failed.

Files representing temporary channels are stored in directories managed by the process daemon and are cleaned up after job completion. Similarly, vertices are killed by the process daemon if their parent job manager crashes.

Figure 6:
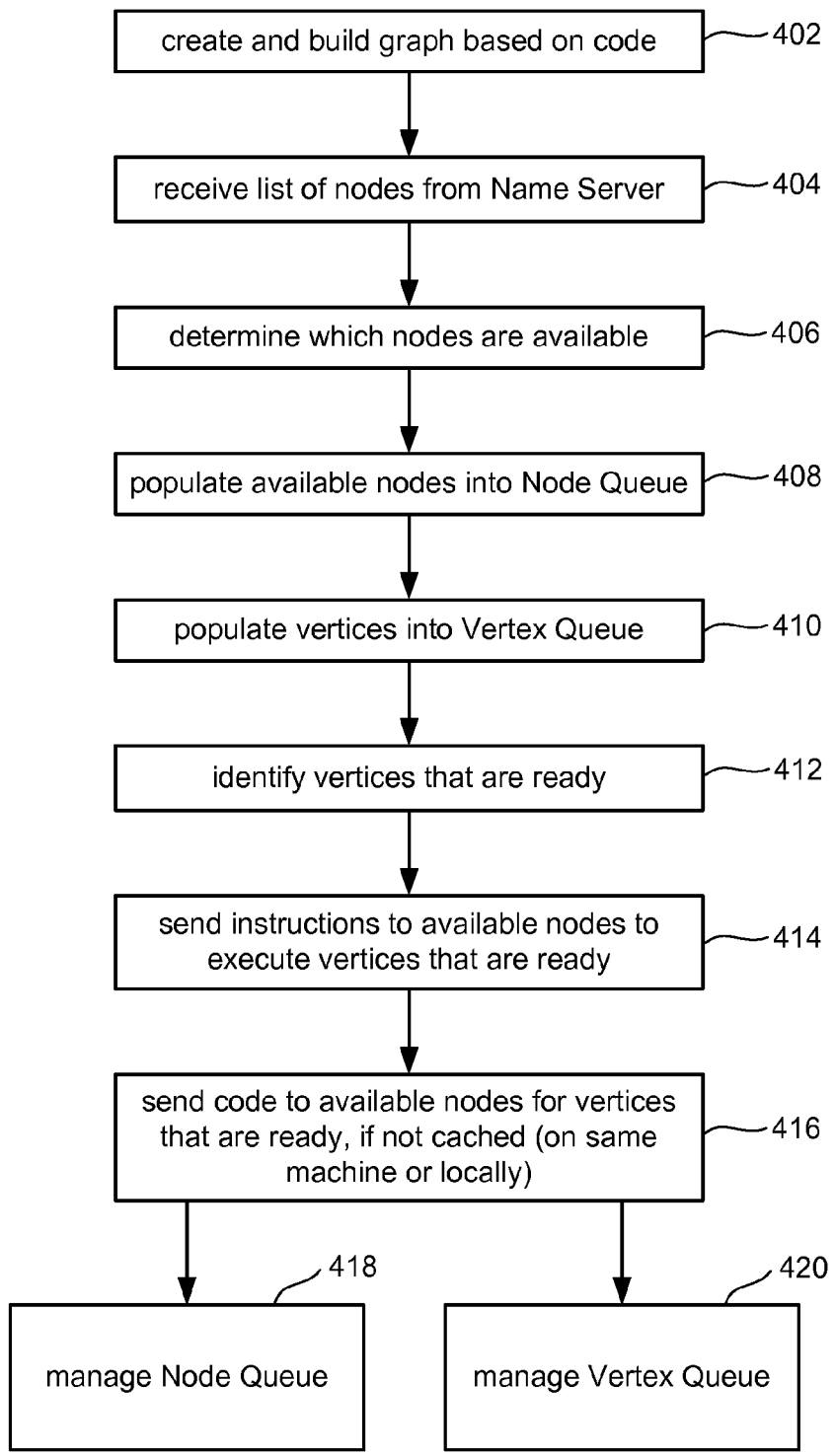
FIG. 6 is a flow chart describing one embodiment of a process for executing the code of FIG. 4.

FIG. 6 depicts a flowchart describing one embodiment of a process performed by Job Manager 14 when executing code 300 on the distributed execution engine of FIG. 1. In step 402, Job Manager 14 creates the graph based on code 322 and then builds the graph based on code 324. More details of step 402 are provided below. In step 404, Job Manager 14 receives a list of nodes from Name Server 16. Name Server 16 provides Job Manager 14 with the name (or identification) of each node within the network as well as the position of each node within the tree-structured network. In many embodiments, a node is a computing machine. In some embodiments, a computing machine may have more than one node.

In step 406, Job Manager 14 determines which of the nodes are available. A node is available if it is ready to accept another program (associated with a vertex) to execute. Job Manager 14 queries each process daemon to see whether it is available to execute a program. In step 408, Job Manager 14 populates all of the available nodes into Node Queue 360. In step 410, Job Manager 14 places all the vertices that need to be executed into Vertex Queue 358. In step 412, Job Manager 14 determines which of the vertices in Vertex Queue 358 are ready to execute. In one embodiment, a vertex is ready to execute if all of its inputs are available.

In step 414, Job Manager 14 sends instructions to the process daemons of the available nodes to execute the vertices that are ready to be executed. Job Manager 14 pairs the vertices that are ready with nodes that are available, and sends instructions to the appropriate nodes to execute the appropriate vertex. In step 416, Job Manager 14 sends the code for the vertex to the node that will be running the code, if that code is not already cached on the same machine or on another machine that is local (e.g., in same sub-network). In most cases, the first time a vertex is executed on a node, its binary will be sent to that node. After executing the binary, that binary will be cached. Thus, future executions of that same code need not be transmitted again. Additionally, if another machine on the same sub-network has the code cached, then the node tasked to run the code could get the program code for the vertex directly from the other machine on the same sub-network rather than from Job Manager 14. After the instructions and code are provided to the available nodes to execute the first set of vertexes, Job Manager 14 manages Node Queue 360 in step 418 and concurrently manages Vertex Queue 358 in step 420.

Managing node queue 418 includes communicating with the various process daemons to determine when there are process daemons available for execution. Node Queue 360 includes a list (identification and location) of process daemons that are available for execution. Based on location and availability, Job Manager 14 will select one or more nodes to execute the next set of vertices.

FIG. 7 is a flowchart describing one embodiment of a process for managing Vertex Queue 358 (see step 420 of FIG. 6). In step 502, Job Manager 14 monitors the vertices running in the system, monitors the vertices in Vertex Queue 358 and provides fault tolerance services. The monitoring of vertices running includes determining when vertices have completed running the program code for a particular vertex. The monitoring of vertices in Vertex Queue 358 includes determining when a vertex is ready for execution, for example, due to all the inputs to that vertex being available.

The fault tolerance services provided by Job Manager 14 include the execution of a fault tolerance policy. Failures are possible during the execution of any distributed system. Because the graph is acyclic and the vertex programs are assumed to be deterministic, it is possible to ensure that every terminating execution of a job with immutable inputs will compute the same result, regardless of the sequence of computer or disk failures over the course of execution. When a vertex execution fails for any reason, Job Manager 14 is informed and the execution record for that vertex is set to Failed. If the vertex reported an error cleanly, the process forwards it via the process daemon before exiting. If the process crashes, the process daemon notifies Job Manager 14, and if the process daemon fails for any reason Job Manager 14 receives a heartbeat timeout. If the failure was due to a read error on an input channel (which should be reported cleanly), the default policy also marks the execution record which generated the version of the channel as failed and terminated its process if it is Running. This will restart the previous vertex, if necessary, and cause the offending channel to be recreated. Though a newly failed execution record may have non-failed successive records, errors need not be propagated forward. Since vertices are deterministic, two successors may safely compute using the outputs of different execution versions. Note, however, that under this policy an entire connected component of vertices connected by pipes or shared memory FIFOs will fail as a unit since killing a Running vertex will cause it to close its pipes, propagating errors in both directions along those edges. Any vertex whose execution record is set to Failed is immediately considered for re-execution.

The fault tolerance policy is implemented as a call-back mechanism which allows nonstandard applications to customize their behavior. In one embodiment, each vertex belongs to a class and each class has an associated C++ object which receives a call-back on every state transition of a vertex execution in that class, and on a regular time interrupt. Within this call-back, the object holds a global lock on the job graph, has access to the entire state of the current computation, and can implement quite sophisticated behaviors such as backfilling whereby the total running time of a job may be reduced by redundantly rescheduling slow vertices after some number (e.g. 95 percent) of the vertices in a class have completed. Note that programming languages other then C++ can be used.

Looking back at FIG. 7, Job Manager 14 will determine whether all vertices for the graph have been completed in step 504. If all the vertices have completed successfully, then the job has completed successfully (step 506). If all the vertices have not completed (step 504), then Job Manager 14 will determine whether there are any vertices in Vertex Queue 358 that are ready for execution (step 508). If there are no vertices ready for execution, then the process loops back to step 502 and Job Manager 14 continues to monitor the queues and provide fault tolerance services. If there is a vertex ready for execution, then (in step 510) Job Manager 14 selects a node from node queue 360 that is available and sends instructions to that available node to execute the vertex that is ready for execution. In step 512, code for that vertex ready is sent to the available node, if that code is not already cached (on the same machine or locally). After sending the code and/or instructions, the process loops back to step 502 and Job Manager 14 continues to monitor the queues and provide fault tolerance services.

Looking back at FIG. 3, a graph is provided of a system that concurrently reads query logs gathered by an Internet search service and determines frequency of searches. In one embodiment, for fault tolerance purposes or other purposes, each file of the query log is stored in three different locations in distributed file system 320. Thus, in one embodiment, when a vertex is assigned to a node in the distributed execution system, Job Manager 14 must choose which of the three copies of the data file to use. FIGS. 8 and 9 provide flowcharts which describe an alternative embodiment for managing Vertex Queue 360 that involves multiple copies of the data. FIG. 8 is a flowchart describing the process for assigning the input vertices (the vertices that read data from the log files) and FIG. 9 provides the process for assigning other vertices.

In step 602 of FIG. 8, Job Manager 14 chooses one of the input vertices in Vertex Queue 358. In step 604, Job Manager 14 finds the location of the three data files for the vertex chosen in step 602. In some embodiments, an input vertex may access data in multiple data files so that Job Manager 14 would need to find 3, 6, 9, 12, etc. (or other number of) data files. In step 606, Job Manager 14 determines which of the data files are near available nodes, which in one embodiment includes being stored on the available node or on the same sub-network. In some embodiments, to save network traffic and speed up execution, a vertex is executed on a node that is also storing the data for that vertex or on a node that is on the same sub-network (connected to same switch) as a machine storing the data for that vertex. In step 608, Job Manager 14 sends instructions to the available node that is also storing the data (or near the data file) in order to execute the particular vertex under consideration. In step 610, the code for that vertex will also be sent to the available node if the program code for the vertex has not already been cached by the available node (or locally). In step 612, Job Manager 14 determines whether there are any more input vertices that need to be considered or run. If so, the process loops back to step 602 to perform steps 602-610 for an additional input vertex. If all the input vertices have run, the process of FIG. 8 is complete and the process of FIG. 9 will be performed.

In step 650 of FIG. 9, Job Manager 14 accesses a vertex in Vertex Queue 358. In step 652, Job Manager 14 determines whether all of the input data for that vertex is available. If all of the input data is not available (step 652), then the process loops back to step 650 and another vertex is accessed in Vertex Queue 358. If all the input data for a particular vertex under consideration is available (step 652), then in step 654 Job Manager 14 finds an available node that is near the inputs. Job Manager 14 looks at Node Queue 360 and determines which of the nodes that are available are also storing the data for the vertex under consideration or are on the same sub-network as the data for the node under consideration. There is a preference to run the vertex on the same node that is storing the data. In step 656, instructions are sent to an available node that is also storing the data or is local to the data in order to execute the vertex under consideration. In step 658, the code for that vertex is also sent to the available node, unless it is cached. In step 660, it is determined if there anymore vertices in Vertex Queue 358. If so, the process loops back to step 650 and is performed on another vertex. If there are no more vertices in Vertex Queue 358 (step 660), then the job is complete.

Figure 10A:
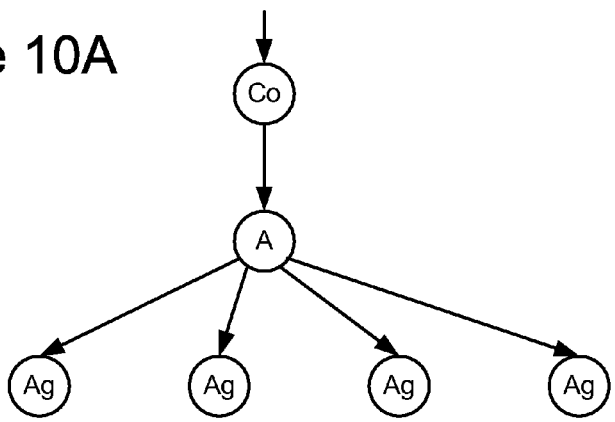
FIG. 10A depicts a portion of a graph.

Sometimes it is desirable to place two or more vertices for execution on the same machine even when they cannot be collapsed into a single graph vertex from the perspective of Job Manager 14. For example, FIG. 10A depicts a graph where two, five or all six vertices can be run on the same computing machine. For example, vertex Co will be run first. When vertex Co completes, vertex A will be run. When vertex A completes, vertices Ag (there are four of them) will be run concurrently. Job Manager 14 will direct that the four vertices Ag are run concurrently. In one embodiment, the developer can recognize that portions of the graph can be collapsed as described above and can mark those vertices (e.g. set a data field or create an object that indicates portion of the graph that can be collapsed). The marked vertices should be connected by a shared memory. Those marked vertices will be executed within a single machine. To the rest of the execution engine, those vertices that are on a single machine can (but is not required to) be treated as one vertex. Each directed edge in the graph FIG. 10A will be treated like a pointer to the data. This will increase efficiency by reducing network traffic. In another embodiment, Job Manager 14 will automatically determine that the nodes can be run on the same machine based on the flow of data, CPU usage and timing of execution.

Figure 10B:
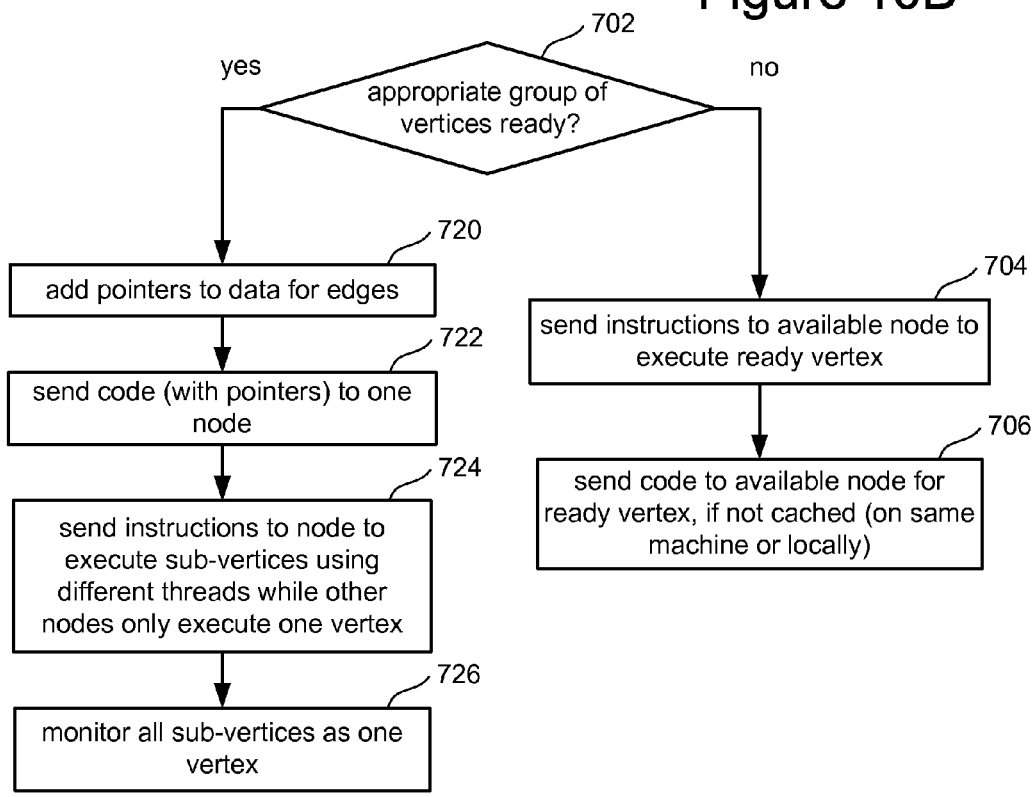
FIG. 10B is a flow chart describing one embodiment of a process for managing vertices.

FIG. 10B provides a flowchart describing a process for executing the multiple vertices of FIG. 10A on a single machine. The process of FIG. 10B can be performed as part of, in addition to, or instead of step 510 and step 512 of FIG. 7. In step 702 of FIG. 10B, Job Manager 14 determines whether there is an appropriate group of vertices ready. An appropriate group may be a set of vertices that Job Manager 14 has automatically determined would be good to collapse so that they all execute on the same machine. Alternatively, determining an appropriate group could be reading whether the developer marked the vertices for potential collapsing. If there is no appropriate group, then Job Manager 14 sends instructions to an available node to execute the next ready vertex, as done in step 510. In step 706, code will be sent to the available node if not already cached (similar to step 512).

If it is determined that there is a group of vertices ready for execution on the same machine (step 702), then in step 720, edges of the graph (which are memory FIFO channels) are implemented at run-time by the vertices by simply passing pointers to the data. In step 722, the code for the multiple vertices is sent to one node. In step 724, instructions are sent to that one node to execute all of the vertices (can be referred to as sub-vertices) using different threads. That is, Job Manager 14 will use library 354 to interact with the operating system for the available node so that vertices that are run serially will be run serially and vertices that need to be run concurrently can be run concurrently by running them using different threads. Thus, while one node can be concurrently executing multiple vertices using multiple threads, (step 720-726), other nodes are only executing one vertex using one thread or multiple threads (steps 704 and 706). In step 726, Job Manager 14 monitors all of the sub-vertices as one vertex, by talking to one process daemon for that machine. In another embodiment the vertices do not all have dedicated threads and instead many vertices (e.g. several hundred) may share a smaller thread pool (e.g. a pool with the same number of threads as there are shared-memory processors, or a few more) and use a suitable programming model (e.g. an event-based model) to yield execution to each other so all make progress rather than running concurrently.

Figure 11:
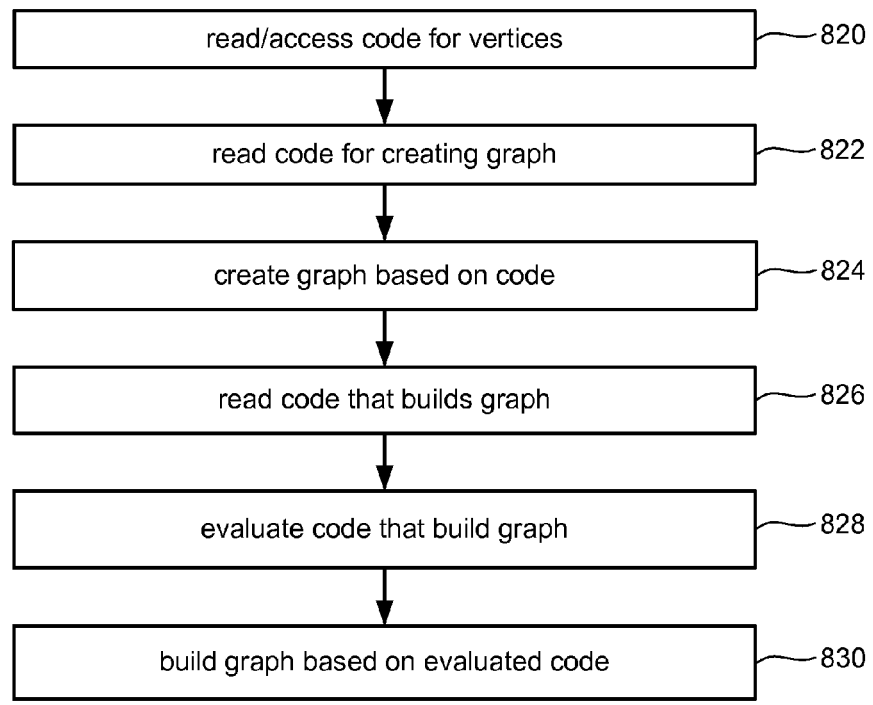
FIG. 11 is a flow chart describing one embodiment of a process for creating and building a graph.

FIG. 11 provides a flowchart describing one embodiment of a process for creating and building a graph based on code 300 (see step 402 of FIG. 6). In step 820, Job Manager 14 reads code 302 for the various vertices. In step 822, Job Manager 14 reads the code 322 for creating a graph. In step 824, the graph is created based on code 322. In step 826, Process Daemon reads code 324. In step 828, various expressions and operators will be evaluated within code 324. In step 830, the graph will be built based on the evaluated code.

In one embodiment, the graph that is built is stored as a Graph Builder Data Structure. FIG. 12 graphically depicts one embodiment of a Graph Builder Data Structure, which includes three groups of data: Graph, Inputs[ ] and Outputs[ ]. The Inputs[ ] is a list of vertices that serve as inputs to the graph. The Outputs[ ] is a list of vertices that serve as outputs to the graph. The Graph element (data structure) includes an array Vertices[ ] of Graph Vertex data structures and an array (Edges[ ]) of Graph Edge data structures. Each Graph Vertex data structure includes a unique identification (UID) and a Program Description. The Program Description is identification of the code that is used to implement the vertex. Each Graph Edge data structure includes a UID for the edge, a UID for the source vertex and a UID for the destination vertex.

A graph is created using code 322 for creating a graph. An example of pseudocode includes the following: T=Create ("m"), which creates a new graph T with one vertex. The program code is identified by "m." That one vertex is both an input and an output. That newly created graph is graphically depicted in FIG. 13. Note, however, that when a graph is created, it is not graphically stored on Job Manager 14. Rather, a Graph Builder Data Structure is created according to the process of FIG. 14.

In step 860 of FIG. 14, a Graph Vertex data structure is created. The program code for "m" is added as the Program Description or a pointer to that code is added. A UID is assigned. In step 862, a Graph data structure is created that has vertex and no edges. In step 864, a Graph Builder Data Structure is created which includes the Graph data structure created in step 862. The Inputs[ ] and Outputs[ ] contain the one UID for the single vertex.

A more complex graph can then be built from that newly created graph using code 324 (see FIG. 4). In one embodiment, there are four operators that can be used to build more complex graphs: Replicate, Pointwise Connect, Cross Connect and Merge. In other embodiments, less than these four operators can be used, more than four operators can be used, and/or other operators can be used. The Graph Builder allows the user to extend the set of graph building operators with new ones. In one implementation, these operators are implemented in C++ code by having library 354 change the meaning of certain operators based on the type of variable in the equations, also known as operator overloading. Note, however, that the exact syntax described below is not important. Other syntaxes and other programming languages can also be used. When job manager evaluates expressions with the operators discussed herein, the results can be used to create a new graph or modify an existing graph.

Figure 15:
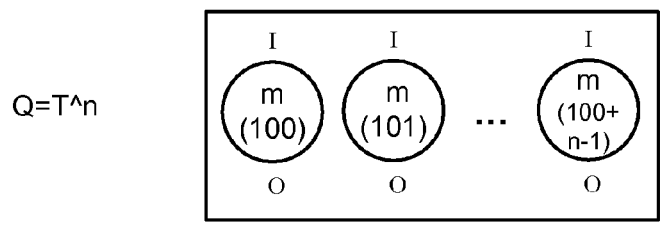
FIG. 15 depicts a graph.

The Replicate operation is used to create a new graph (or modify an existing graph) that includes multiple copies of the original graph. One embodiment includes a command in the following form: Q=T^n. This creates a new graph Q which has n copies of original graph T. The result is depicted in FIG. 15. Note that FIGS. 13 and 15 show each the vertex as a circle and inside the circle is the program description (e.g., "m") and the UID (e.g., 100, 101, . . . ).

Figure 16:
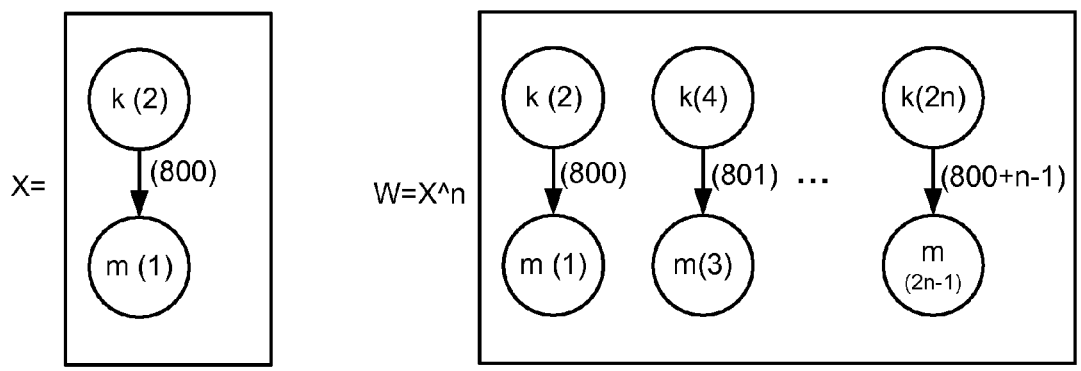
FIG. 16 depicts a graph.

FIG. 16 provides another example for the Replicate operation. Original graph X includes two vertices: k(2) and m(1). Graph X also includes one edge having a UID of 800. FIG. 16 shows original graph X replicated n times so that both vertices and the edge of original graph X are all replicated n times.

Figure 17:
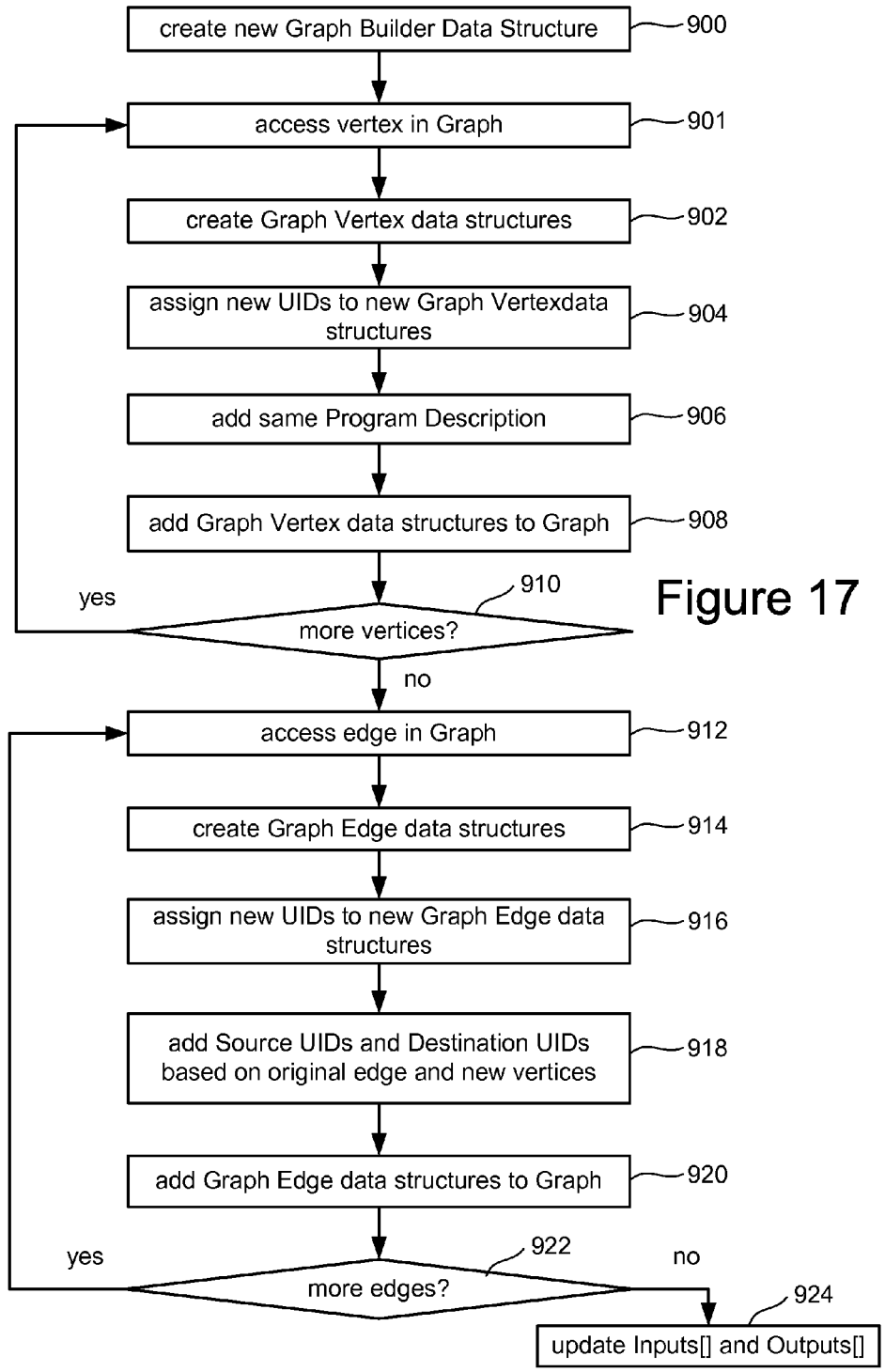
FIG. 17 is a flow chart describing one embodiment of a process for replicating vertices.

FIG. 17 is a flowchart describing one embodiment of the process performed to replicate a graph in response to a replicate command. In step 900, a new Graph Builder Data Structure is created. This new Graph Builder Data Structure is an exact duplicate of the original Graph Builder Data Structure from the replicate command. For example, in the replicate command of FIG. 15, the new Graph Builder Data Structure for Q will be originally created as an exact duplicate of the Graph Builder Data Structure for T.

In step 901 of FIG. 17, a vertex in the original graph is accessed. In step 902, new Graph Vertex data structures are created. New UIDs are assigned to those new Graph Vertex data structures. The Program Description from the original vertex accessed in step 901 is added as the Program Description for these newly created Graph Vertex data structures in step 906. In step 908, the newly created Graph Vertex data structures are added to the newly created Graph data structure of the new Graph Builder Data Structure. In step 910, it is determined whether there are anymore vertices in the original graph to consider. If so, the process loops back to step 901 and the next vertex is considered. If not, the process continues at step 912 to determine whether there are any edges to consider. The first edge is accessed in step 912. In step 914, new Graph Edge data structures are created. New UIDs are added to those new Graph Edge data structures in step 916. The source IDs and destination IDs of the Graph Edge data structures are populated based on the original edge and new vertices in step 918. In step 920, the newly created Graph Edge data structures are added to the newly created Graph data structure. In step 922 it is determined whether there are any more edges to consider. If there are more edges to consider, then the process loops back to step 912 and considers the next edge. If there are no more edges to consider, then the inputs and outputs of the newly created graph builder data structure are updated based on the addition of the new vertices (step 924).

Figure 19:
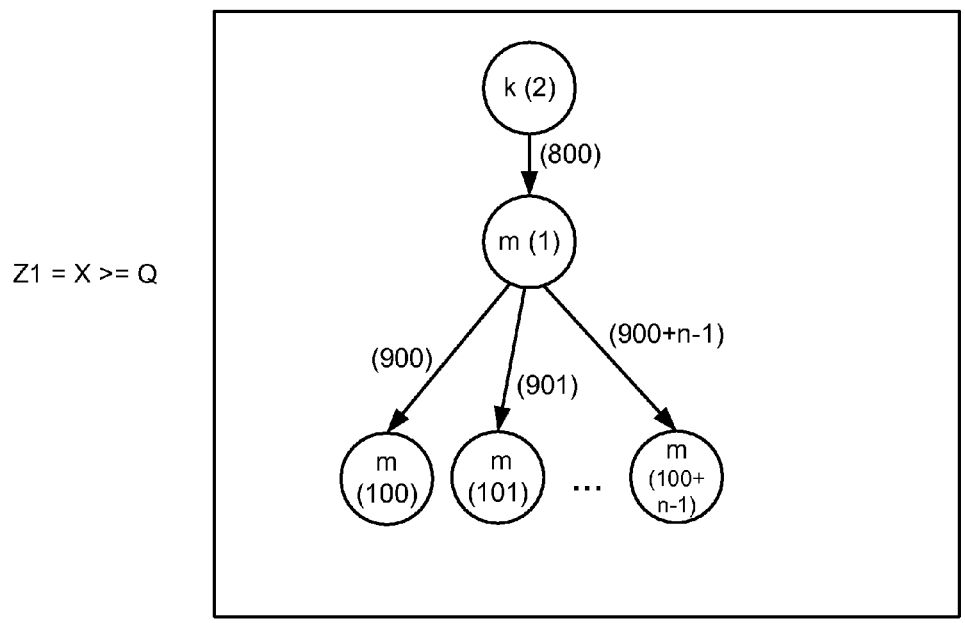
FIG. 19 depicts a graph.

The Pointwise Connect operation connects point-to-point the outputs of a first graph to the inputs of a second graph. The first output of the first graph is connected to the first input of the second graph, the second output of the first graph is connected to the second input of the second graph, the third output of the first graph is connected to the third input of the second graph, etc. If Job Manager 14 runs out of inputs or outputs, it wraps around to the beginning of the set of inputs and outputs. One example of the syntax includes: Y=Q>=W, which creates a new graph Y from connecting graph Q (see FIG. 15) to graph W (see FIG. 16). In the above example, graph Q was the first graph and graph W was the second graph. Another example (Z1=X>=Q) is provided in FIG. 19, which creates a new graph Z1 by connecting graph X (FIG. 16) to graph Q (FIG. 15).

Figure 20:
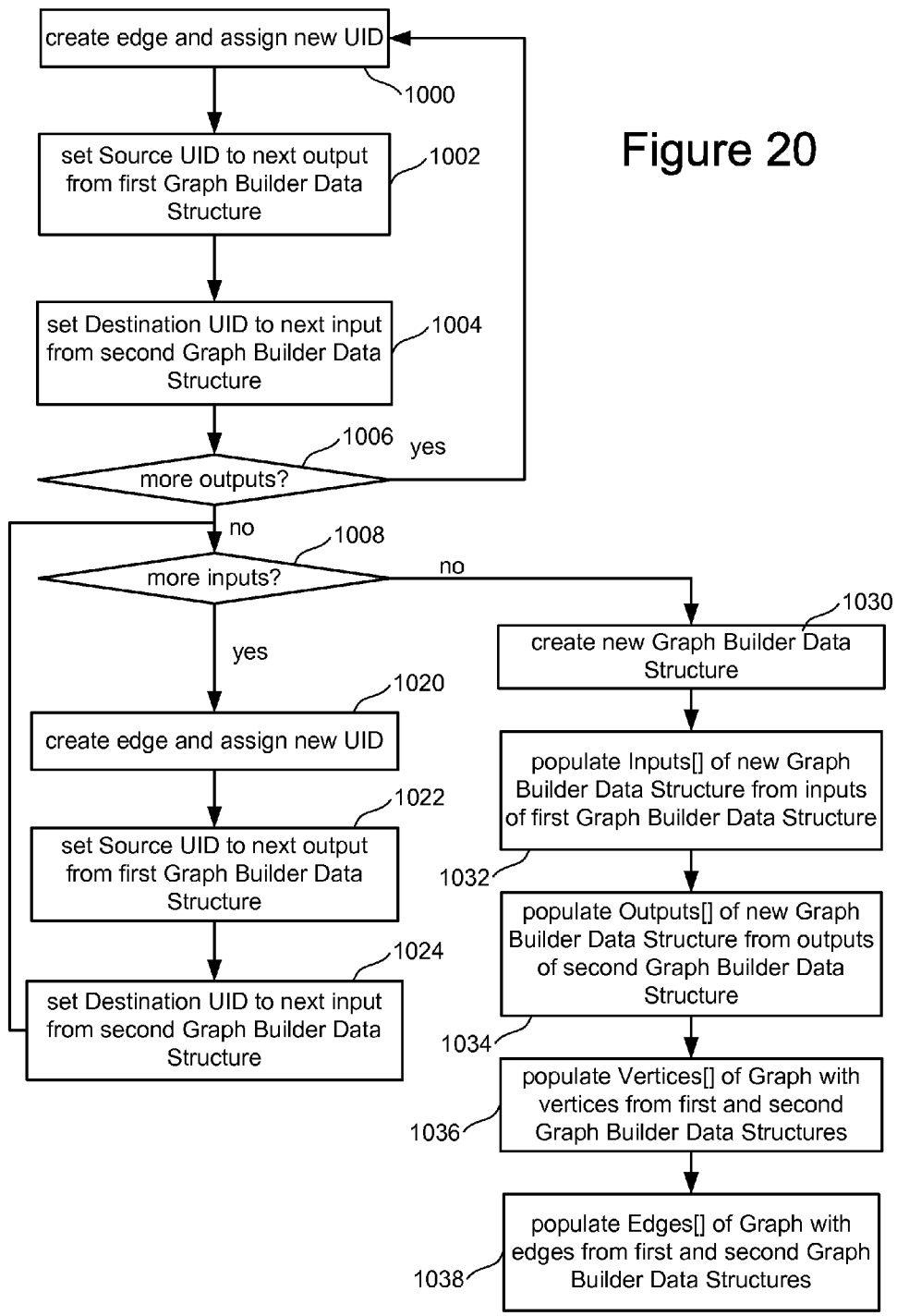
FIG. 20 is a flow chart describing one embodiment of a process for connecting graphs.

FIG. 20 provides a flowchart describing one embodiment of the process for performing the pointwise connection operation. In general, a new graph is created which concludes all the vertices of the first and second graphs, the existing edges of the first and second graphs, and new edges that connect the two graphs together. The existing vertices and existing edges will include the same UID as the original graphs. The new edges will include new UIDs.

In step 1000 of FIG. 20, a new Graph Edge data structure is created and provided with a new UID. The Source UID is set to be the next output from the first Graph Builder Data Structure. If this is the first time step 1002 is being performed, then the next output is the first output. For example, in FIG. 18 the first Graph Builder Data Structure is for graph Q. The first output from graph Q is the output from the vertex with the UID of 100. In step 1000, the Destination UID for the currently operated on edge is set to the next input from the second graph of the data structure. If it is the first time that step 1004 is being performed, then it is the first input that is being considered. For example, in FIG. 18 the second graph builder data structure is for graph W and the first input for graph W is the input of the vertex with the UID of 2. In step 1006, Job Manager 14 determines whether there are any more outputs on the first graph data builder structure that have not been considered yet. If so, the process loops back to step 1000 and another Graph Edge data structure is created. If all the outputs have been considered, then in step 1000 it is determined whether there are anymore inputs to consider that have not already been considered. If there are more inputs to consider, then a new Graph Edge data structure is created in step 1020 and assigned a new UID. In step 1022, the Source UID for that newly created Graph Edge data structure is the next output from the first Graph Builder Data Structure. In this case, all of the outputs have already been considered once so the next output would wrap around. For example, the vertex with a UID of 100 may be considered another time. In step 1024, the Destination UID is set to be the next input from the second graph builder data structure.

Figure 18:
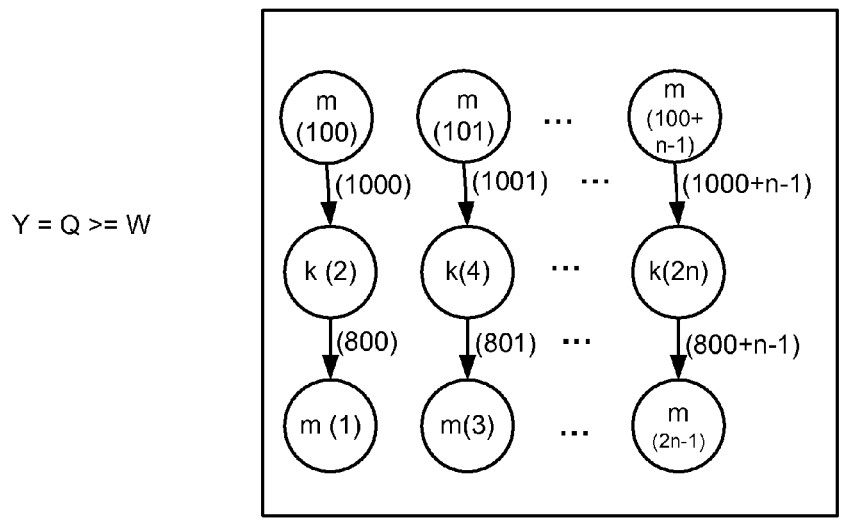
FIG. 18 depicts a graph.

If there are no more inputs to consider (step 1008), then in step 1030 a new Graph Builder Data Structure is created. In step 1032, the Inputs[ ] of the new Graph Builder Data Structure are populated with the Inputs[ ] from the first original Graph Builder Data Structure. In the example of FIG. 18, the Inputs[ ] for the new Graph Builder Data Structure will be populated the Inputs[ ] from Q. In step 1034, the Outputs[ ] of the new Graph Data Builder Structure will be populated with the Outputs[ ] from the second Graph Data Builder Structure. In the example of FIG. 18, the Outputs[ ] of the new Graph Builder Data Structure will be the Outputs[ ] from graph W. In step 1036, the vertices of the new graph builder data structure will be populated with the vertices from the first Graph Builder Data Structure and the second Graph Builder Data Structure. For example, the vertices in the example of FIG. 18 will include all of the vertices from Q and all of the vertices from W. In step 1038, the edges of the new Graph Builder Data Structure will include all of the edges from the first Graph Data Builder Structure, all the edges from the second Graph Data Builder Structure, and all the edges created in steps 1000-1024.

Figure 21:
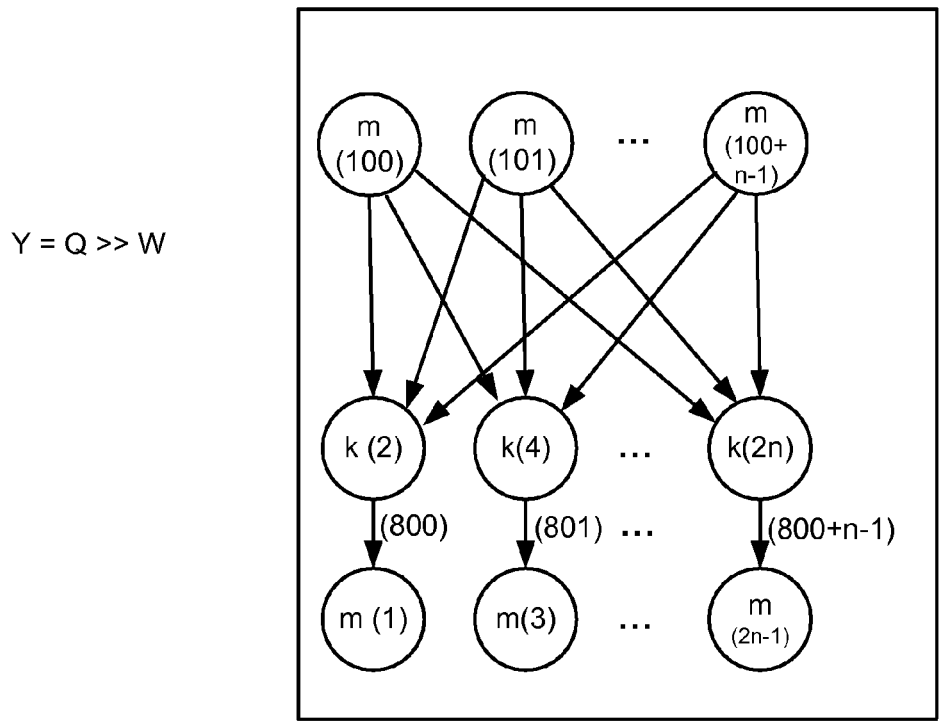
FIG. 21 depicts a graph.
Figure 22:
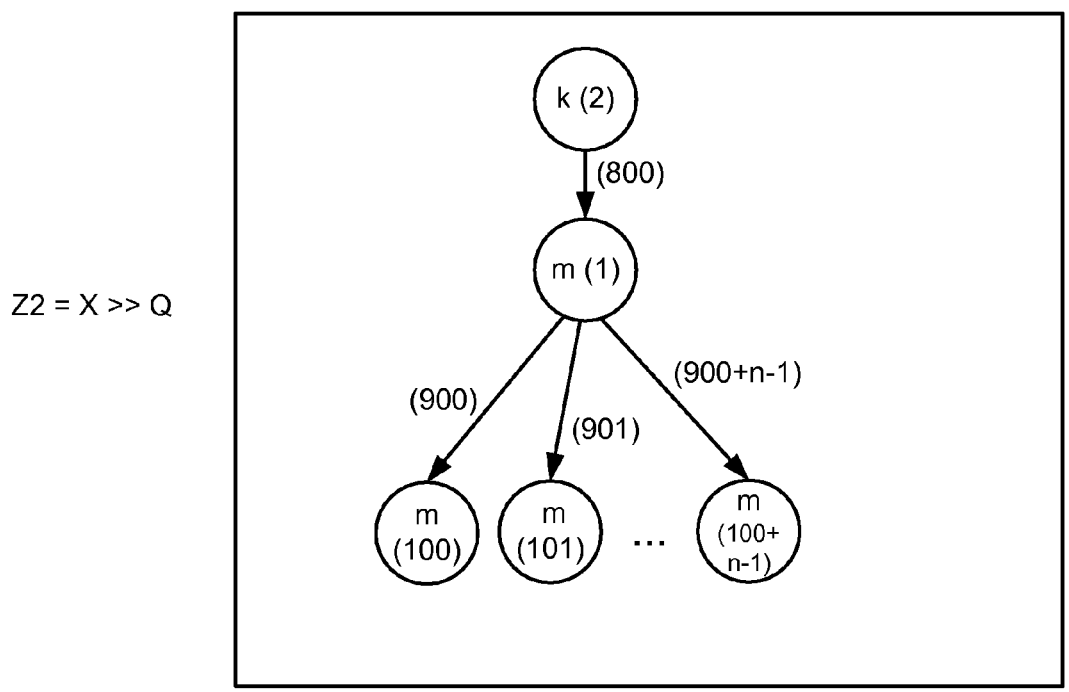
FIG. 22 depicts a graph.

The Cross Connect operation connects two graphs together with every output of the first graph being connected to every input of the second graph. One example syntax includes Y=Q>>W, which creates a new graph Y that is a connection of graph Q to graph W such that all the outputs of graph Q are connected to all of the inputs of graph W. FIG. 21 provides an example of this Cross Connect operation. FIG. 22 provides a second example of a Cross Connect operation Z2=X>>Q, which pertains to creating a new graph Z2 made from connecting graph X (see FIG. 16) to graph Q (see FIG. 15) such that all the outputs of graph X are connected to all the inputs of graph Q. Note that graph X only has one output and graph Q has three inputs. Thus, the one output of graph X is connected to all three inputs of graph Q.

Annotations can be used together with the connection operators (Pointwise Connect and Cross Connect) to indicate the type of the channel connecting two vertices: temporary file, memory FIFO, or TCP pipe.

Figure 23:
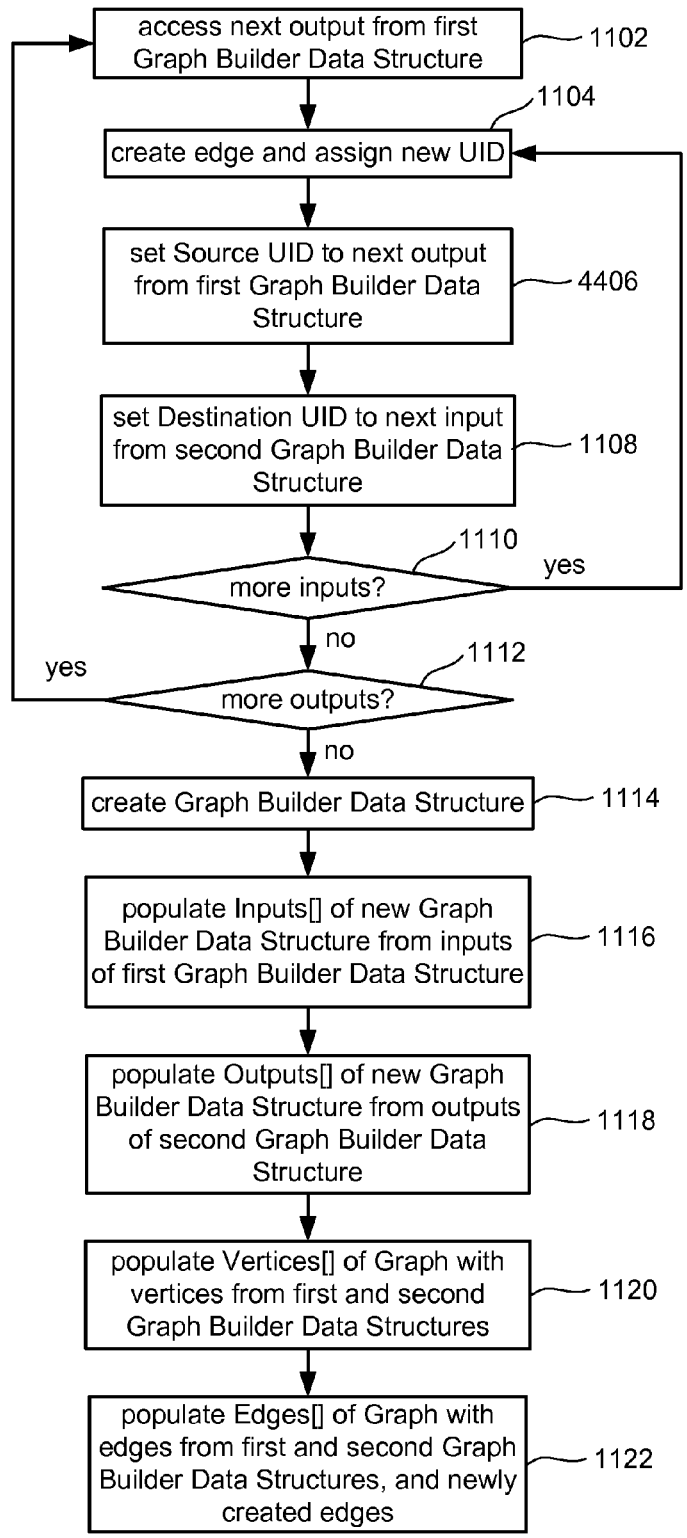
FIG. 23 is a flow chart describing one embodiment of a process for connecting graphs.

FIG. 23 is a flowchart describing one embodiment of the process for implementing the Cross Connect operation. In step 1102, the next output from the first Graph Builder Data Structure is accessed. In the example of FIG. 21, the output for the vertex with the UID of 100 is accessed during the first time step 1102 is performed. In step 1104, a new Graph Edge data structure is created and assigned a new UID. In step 1106, the Source UID for the new Graph Edge data structure is set to be that next output accessed in step 1102. In step 1108, the Destination UID is set to be the next input from the second Graph Builder Data Structure. In the example of FIG. 21, the next input is associated with the vertex having a UID of 2 during the first time step 1108 is performed. In step 1110, it is determined whether there are more inputs to consider. In the example of FIG. 21, there are (n−1) more inputs to consider; therefore, the process loops back to step 1104 and a new edge is created. That new edge will have the same Source UID as the previously created edge but a new Destination UID. Steps 1104-1108 are performed for each input of the second graph. Thus, for the example of FIG. 21, that loop is performed n times, with the Source UID being the same each iteration.

When there are no more inputs to consider (step 1110), then Job Manager 14 tests whether there are anymore outputs in the first Graph Builder Data Structure that have not been considered. For example, in FIG. 21 there are n outputs in the first Graph Data Builder Structure associated with graph Q. If there are more outputs to consider, then the process loops back to step 1102 and a new set of edges are created with the Source ID for the new edges all being equal to the next output from the first Graph Builder Data Structure.

When all of the outputs have been considered (step 1102), then in step 1114 a new Graph Builder Data Structure is created. In step 1116, the Inputs[ ] of the new graph data builder structure is populated with the Inputs[ ] from the first Graph Data Builder Structure (e.g., graph Q of FIG. 21). In step 1118, the Outputs[ ] of the new Graph Builder Data Structure is populated from the Outputs[ ] of the second Graph Builder Data Structure (e.g., the outputs of graph W in the example of FIG. 21). In step 1120, the Vertices[ ] of the Graph data structure for the newly created Graph Builder Data Structure is populated with all the Vertices[ ] from the first Graph Builder Data Structure and the second Graph Builder Data Structure. Therefore, in the example of FIG. 21, all of the vertices of graph Q and all the vertices of graph W are added to the Vertices[ ] array of the Graph Builder Data Structure. In step 1122, the Edges of the Graph data structure is populated with all of the edges from the first Graph Builder Data Structure, all of the edges from the second Graph Builder Data Structure and all of the newly created edges.

Figure 24:
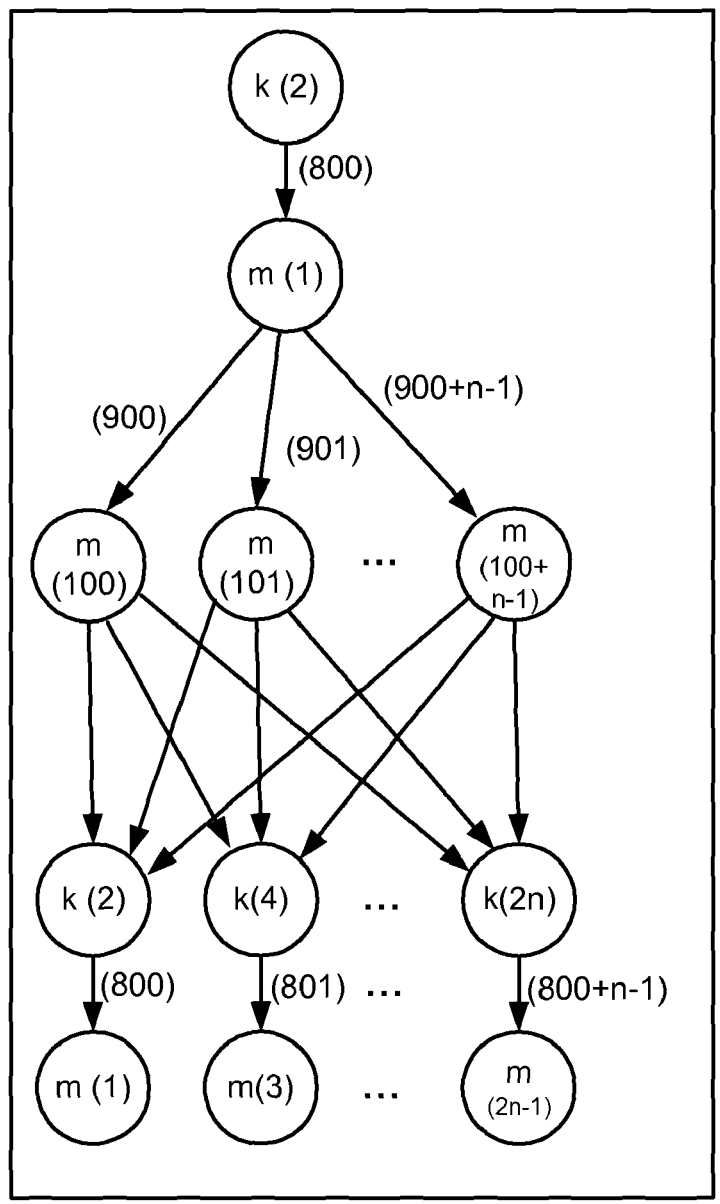
FIG. 24 depicts a graph.

The Merge operation combines two graphs that may not be disjoint. The two graphs have one or more common vertices and are joined at those common vertices, with duplicate vertices being eliminated. An example syntax includes N=Z2∥Y, which indicates that a new graph N is created by merging graph Z2 with graph Y. FIG. 24 graphically depicts this merge operation. Graph Z2 (see FIG. 22) and graph Y (see FIG. 21) both include nodes with UIDs of 100, 101, . . . 100+n−1. When these two graphs are merged, one set of those nodes are eliminated and the graphs are connected at the common nodes, as depicted in FIG. 24.

Figure 25:
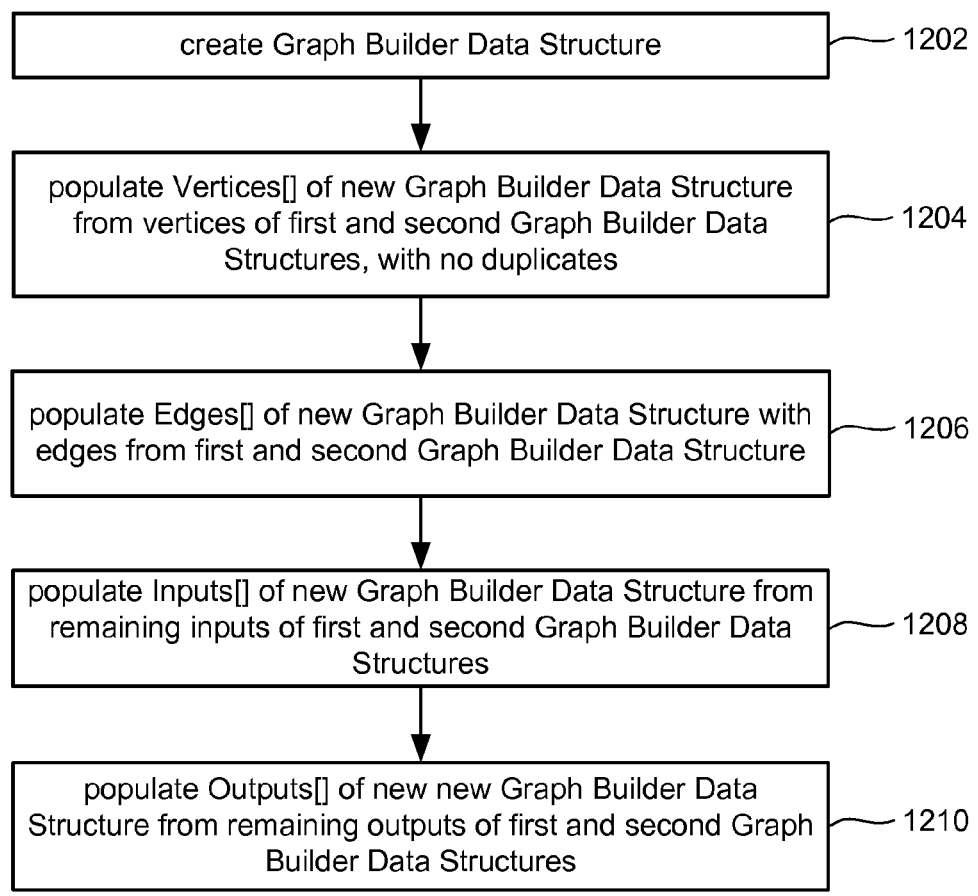
FIG. 25 is a flow chart describing one embodiment of a process for merging graphs.

FIG. 25 provides a flowchart describing one embodiment of the process for implementing the Merge operation. In step 1202, a new Graph Builder Data Structure is created. In step 1204, the Vertices[ ] of the Graph data structure within the new Graph Builder Data Structure are populated with all of the Vertices[ ] from the first Graph Builder Data Structure (e.g., graph Z2) and all of the Vertices[ ] of the second Graph Data Builder Structure (e.g., graph Y), eliminating duplicates. In step 1206, the Edges[ ] of the Graph data structure within the new Graph Builder Data Structure are populated from all of the Edges[ ] of the first Graph Builder Data Structure and all of the Edges[ ] of the second Graph Builder Data Structure. In step 1208, the Inputs[ ] array of the new Graph Builder Data Structure is populated with all the remaining Inputs[ ] of the combined graph. In step 1210, the Outputs[ ] array is populated with all of the outputs that remain after the two original graphs are merged.

Figure 27:
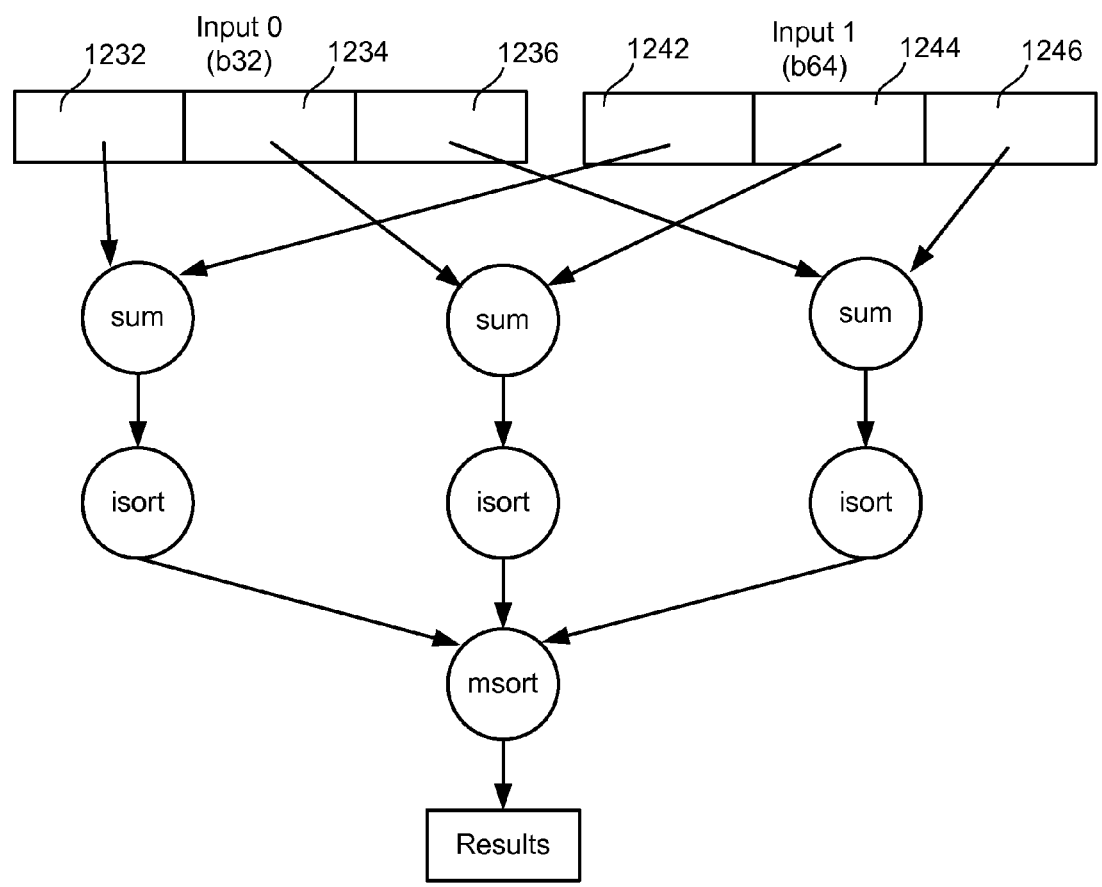
FIG. 27 depicts a graph.

An example of code 300 for a simple application using the above-described technology is presented in FIG. 26. This code defines two fixed-length data types U32 and U64 (for 32-bit and 64-bit unsigned integers respectively) and a Sum Vertex (sum) which reads from two channels, one of each type, pairing and summing the inputs and outputting as a stream of 64-bit numbers. The corresponding graph is depicted in FIG. 27. Each input set (Input 0 and Input 1) is partitioned to the same number of files. For example, Input 0 is partitioned into files 1232, 1234 and 1236. Input 1 is divided into files 1242, 1244 and 1246. For each file of each input set, a custom vertex "sum" receives values from both inputs and uses a library vertex (isort) to sort the resulting stream in memory. Finally, the sorted output from all of the partitions is passed through a library streaming merge sort (msort) to the output. Thus, each of the "sum" vertices communicates directly to a corresponding "isort" vertex. The three "isort" vertices all communicate to the single "msort" vertex, which reports the results to the "Results" output file.

The code of FIG. 26 shows code section 1280, which defines the new custom "sum" vertex and corresponds to code 302 of FIG. 4. Code portions 1282 (corresponding to code 302 of FIG. 4) makes the in memory sorter (isort) and a merger sorter (msort) using library code 354. Code section 1284 creates a new graph and corresponds to code section 322 of FIG. 4. Code section 1286 of FIG. 26 builds the new graph and corresponds to code 324 of FIG. 4. Code section 1288 passes the graph to the runtime and corresponds to code section 326 of FIG. 4.

Users of large distributed execution engines strive to increase efficiency when executing large jobs. In some instances it may be efficient to modify the graph provided by a developer in order to decrease the resources needed to complete the job. For example, based on knowing which nodes are available, it may be efficient to reduce network traffic by adding additional vertices. Although adding more vertices may increase the amount of computations that need to be performed, it may reduce network traffic. In many cases, network traffic tends to be more of a bottleneck than the load on CPU cores. However, the developer will not be in a position to know in advance which nodes of a execution engine will be available at what time. Therefore, for the graph to be modified to take into account a current state of an execution engine, the modifying of the graph must be done automatically by Job Manager 14 (or other entity that has access to the runtime environment). Note that there may be other goals, in addition to reducing network activity, that may cause Job Manager 14 to automatically modify a graph during runtime.

Figure 28:
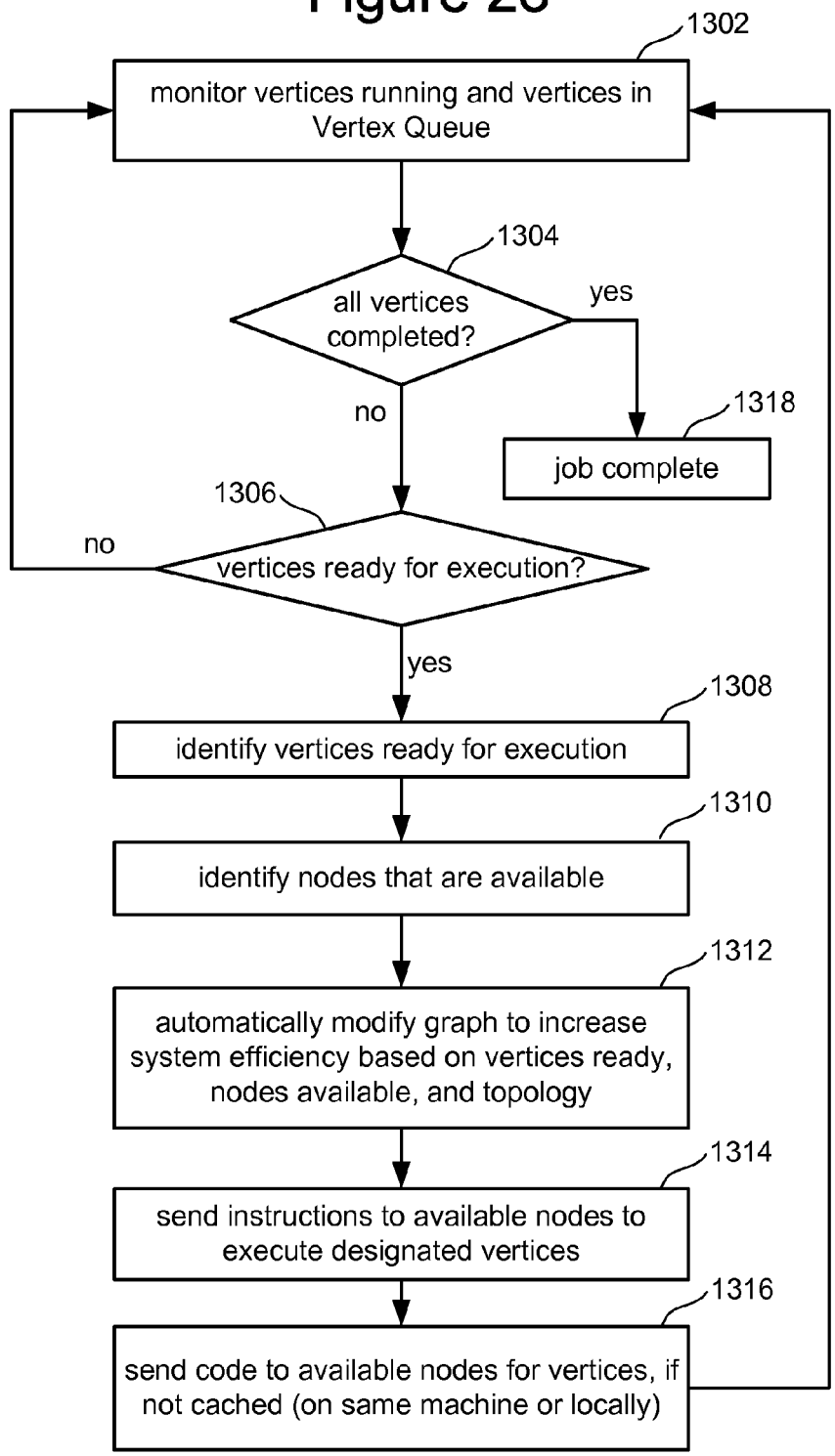
FIG. 28 is a flow chart describing one embodiment of a process for managing vertices that includes modifying a graph.

FIG. 28 is a general flowchart describing one embodiment of a process for managing Vertex Queue 358 that includes automatically modifying a graph to increase system efficiency based on vertices ready for execution, nodes available and topology. Other factors can also be taken into a consideration. In step 1302, Job Manager 14 monitors the vertices running and the vertices in Vertex Queue 358. In step 1304, Job Manager 14 determines whether all vertices have completed. If so, the job is complete. If not, Job Manager 14 determines which vertices are ready for execution. If there are no vertices ready for execution, then the process loops back to step 1302 and Job Manager 14 continues to monitor the vertices running in Vertex Queue 358. If there are vertices ready for execution (step 1306), then Job Manager 14 identifies those vertices that are ready for execution in step 1308. In step 1310, Job Manager 14 identifies nodes that are available to executing vertices. In step 1312, the graph is automatically modified to increase system efficiency based on vertices ready for execution, nodes available and/or location of nodes in the network. In step 1314, instructions are sent to the appropriate available nodes to execute the vertices that are ready for execution of the modified graph. In step 1316, code for the vertices ready for execution is sent to the available nodes, if that code is not already cached at the node or nearby the node. After step 1316, the process loops back to step 1302. Note that there are many criteria to be used for automatically modifying the graph and many schemes for performing the automatic modification. Some of those alternatives will be discussed below.

One example of how a graph may be automatically modified is described with respect to FIG. 3. As explained above, FIG. 3 provides a graph for a system that reads query logs gathered by an Internet search engine, extracts the query strings, and builds a histogram of query frequencies sorted by frequency.

Figure 29:
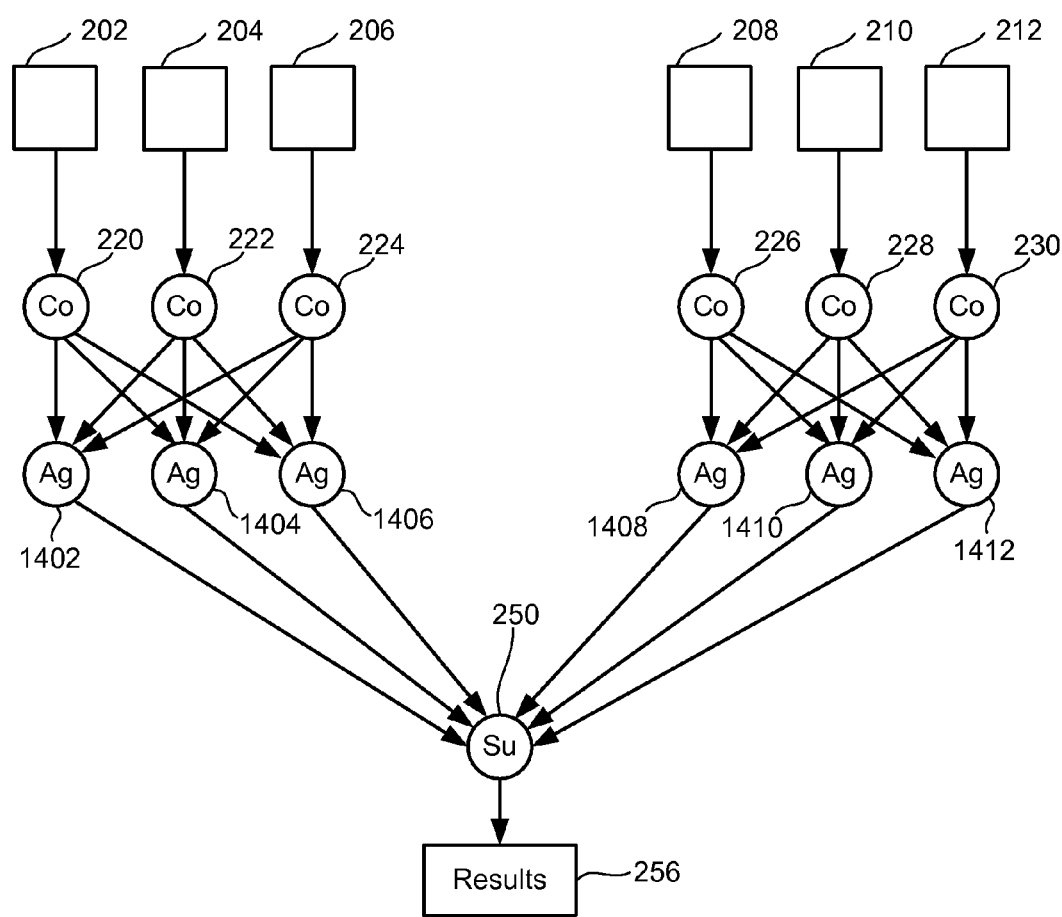
FIG. 29 depicts a graph.

FIG. 29 depicts one example modification to the graph of FIG. 3. FIG. 29 shows vertices 220, 222 and 224 grouped as a first group; and vertices 226, 228 and 230 grouped as a second group. The first group will be run on a first sub-network and the second group will be run on a different sub-network. FIG. 3 shows all of the vertices 220-230 reporting the results to three aggregator vertices 242-246. By separating out the groups as depicted in FIG. 29, each group has its own set of three aggregator vertices. For example, the first group includes aggregator vertices 1402, 1404 and 1406. The second group includes aggregator vertices 1408, 1410 and 1412. Now, there are six aggregator vertices instead of three aggregator vertices. All six aggregator vertices will report to sum vertex 250. With the additional aggregator vertices, there is more computations being performed and, thus, more raw CPU time being used. However, because each group (including corresponding aggregator vertices) is within a sub-network, the network traffic is reduced dramatically. In many embodiments, network traffic creates more of a bottleneck than CPU usage. The graph of FIG. 3 can be automatically modified to become the graph of FIG. 29 using the process of FIG. 28. Job Manager 14 will determine which nodes in the network are available and where the data is. Job manager 14 will attempt to find enough nodes to create a group that can run on one sub-network. In one embodiment, the group is executed on the sub-network that is also storing the data for the vertices of that group.

Figure 30:
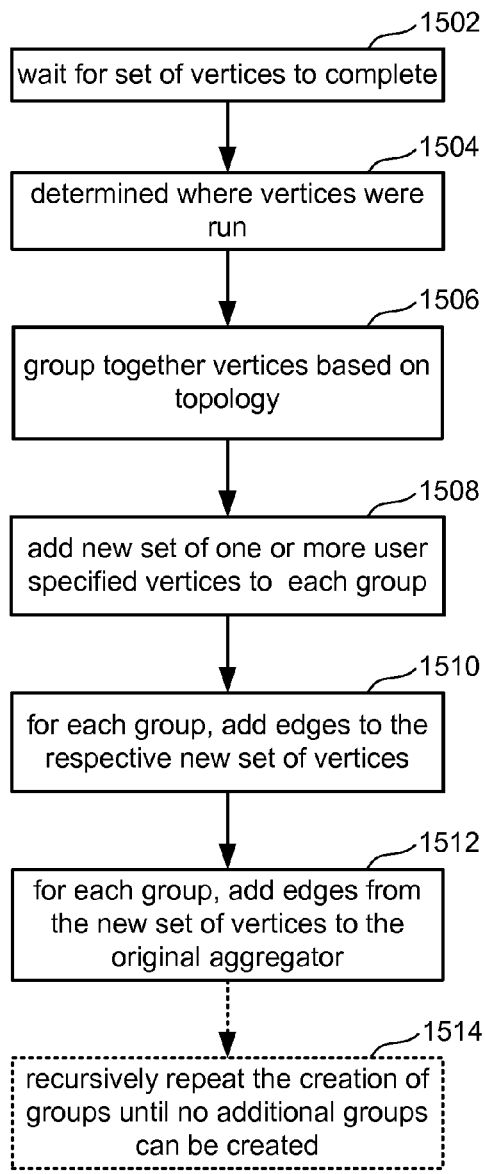
FIG. 30 is a flow chart describing one embodiment of a process for automatically modifying a graph.

FIG. 30 is a flowchart describing one embodiment of an example process for automatically modifying the graph (see step 1312 of FIG. 28). In step 1502, Job Manager 14 will wait for the previous set of vertices to complete execution. For example, Job Manager 14 will wait for vertices 220-230 to complete execution. Job Manager 14 can wait for a specified time, for a specified amount of vertices to complete or for a portion of the graph to complete. In step 1504, Job Manager 14 determines where those vertices were run (e.g., which nodes ran the vertices and on which sub-networks). In step 1506, those vertices executed on the same sub-network are grouped together. In other embodiments, the grouping can be a set of related sub-networks or some other criteria based on topology. In step 1508, a new set of one or more user specified vertices can be added to each group. For example, a user may specify a portion of the graph that can be grouped together and user can specify the additional vertices added to create the group. In step 1510, for each group, new edges are added to connect to the new vertices (e.g., new edges from vertices 220, 222, 224 to vertices 1402, 1404, 1406). In step 1512, for each group, edges are added from the new set of vertices to the original aggregator or other vertex (e.g., from vertices 1402, 1404, 1406 to vertex 250). In an optional embodiment, step 1514 can include recursively repeating the above grouping, adding of new edges, and adding of new vertices until no additional groups can be created.

In one embodiment, library 354 (see FIG. 5) includes a function that allows a developer to specify a portion of the graph that can be grouped together and a new vertex to be added to that group. One example is Create_Dynamic_Merge (G,u), which allows a user to specify a graph G (which is a portion of the overall graph) that can be grouped and new vertex u that will be added to the group to perform data reduction prior to aggregating the data from the various groups.

Figure 31:
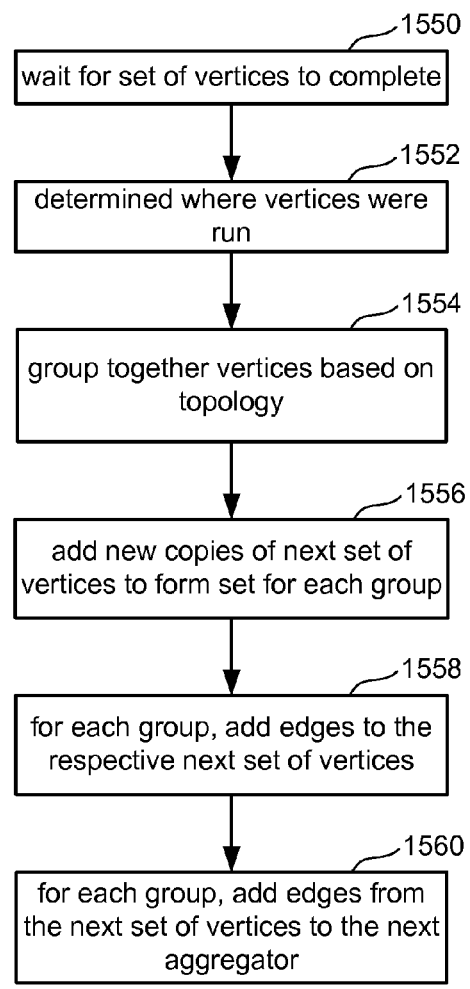
FIG. 31 is a flow chart describing one embodiment of a process for automatically modifying a graph.

FIG. 31 is an alternative embodiment for automatically modifying the graph which does not require the user to specify a new aggregator vertex to be used for modifications. In step 1550, Job Manager 14 waits for the set of vertices to complete, as done in step 1502. In step 1552, Job Manager 14 determines where those vertices were run. In step 1554, vertices will be grouped together based on topology, as in step 1506. In step 1556, new copies of the next set of vertices are added to form the set for each group. For example, as done in FIG. 29, new copies of existing vertex Ag were added to create the groups. For each group, edges are added to this new set of vertices (similar to step 1570). At step 1560, edges are added from the new set of vertices to the original aggregator (similar to step 1512).

Figure 32A:
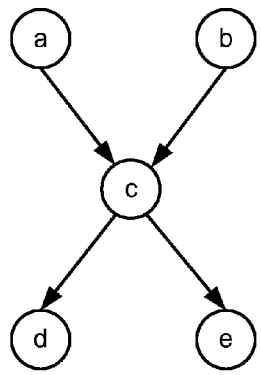
FIG. 32A depicts a graph.
Figure 32B:
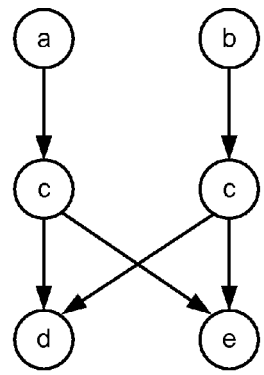
FIG. 32B depicts a graph.

Another modification can include removing bottlenecks. For example, FIG. 32A shows a portion of a graph with a bottleneck. Vertex a and vertex b both communicate to vertex c. Vertex c communicates its output to vertex d and vertex e. In one implementation, vertex c can be a bottleneck on the system. No matter how fast vertex a runs, vertex d (which may only need data from vertex a) may have to wait for its output until vertex c has completed processing data from vertex b. One modification, depending on the logic of vertex c, can be as depicted in FIG. 32B. The graph of FIG. 32B shows communication of data from vertex a directly to a first vertex c, and then from the first vertex c directly to vertex d. Additionally, data is communicated from vertex b directly to a second vertex c and from the second vertex c directly to vertex e. In the graph of FIG. 32B, there is no bottleneck at vertex c.

Figure 33:
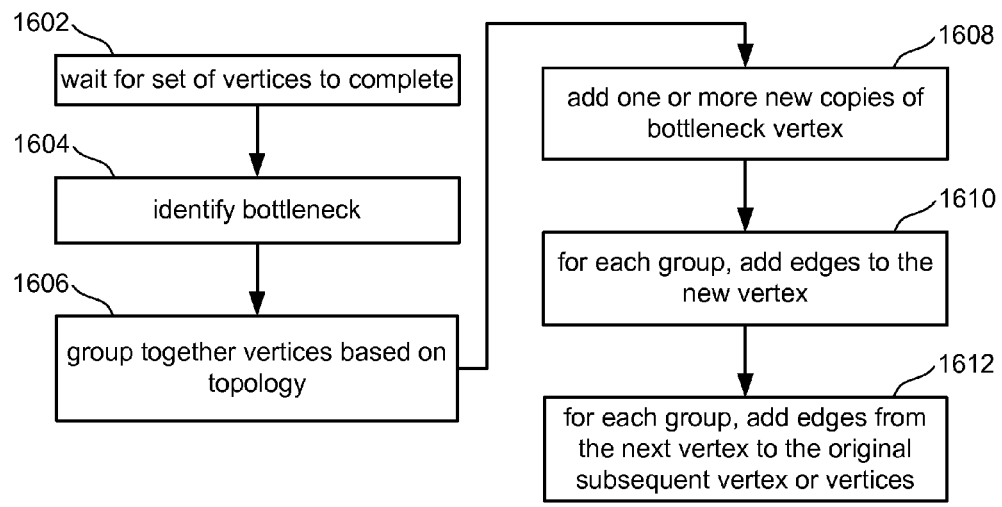
FIG. 33 is a flow chart describing one embodiment of a process for automatically modifying a graph.

FIG. 33 is a flowchart describing another embodiment for automatically modifying a graph, as depicted in FIGS. 32A and 32B. In step 1602, Job Manager 14 waits for a set of vertices to complete (similar to step 1502 of FIG. 30). In step 1604, Job Manager 14 identifies a bottleneck in the graph. For example, Job Manager 14 determines that node C of FIG. 32A is a bottleneck. In step 1606, vertices will be grouped together based on flow of data. For example, vertices a and d can be in one group and vertices b and e can be another group. In step 1608, one or more new copies of the bottleneck vertex (e.g., vertex c) are added to each group. New edges are added in each group to the new vertex (e.g., adding edges from a to c and from b to c). In step 1612, each new edge are added from the new vertex to an original subsequent vertex or vertices (e.g., adding edges from c to d and c to e). Note that while some examples are given for automatically modifying the graph, there are many other modifications that can be performed for various reasons related to topology, data flow, state of the execution engine, etc.

In other embodiments, the automatic modification of the graph can depend on the volume, size or content of the data produced by vertices which have executed. For example, an application can group vertices in such a way that none of the dynamically generated vertices has a total input data size greater than some threshold. The number of vertices that will be put in such a group is not known until run time. Additionally, a vertex can report some computed outcome to the Job Manager, which uses it to determine subsequent modifications. The vertices can report the amount of data read and written, as well as various status information to the Job Manager, all of which can be taken into account to perform modifications to the graph.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

I claim:

1. A method for performing distributed parallel processing, comprising:
    assigning a first set of code corresponding to vertices of a graph to various nodes of a distributed parallel processing engine based on said graph, said graph defines a parallel processing job, vertices of said graph represent code and edges represent data channels;
    automatically modifying said graph during runtime based on executing said first set of code, wherein said automatically modifying said graph comprises determining where in a network said first set of code executed, grouping together at least a first subset of said first set of code that executed in a common section of said network and adding additional code to process data from said first subset, said additional code corresponds to a new vertex on said graph, said additional code is assigned to run in said common section, said additional code is a copy of code for an existing vertex; and
    assigning a second set of code corresponding to vertices of said graph to various nodes of said distributed parallel processing engine based on said modified graph, said first set of code and said second set of code are part of said parallel processing job.

2. A method according to claim 1, wherein said automatically modifying said graph further comprises:
    providing a data channel to said additional code from existing code corresponding to an existing original node in said graph; and
    causing said additional code to be executed in said common section of said network.

3. A method according to claim 1, wherein:
    said additional code includes code for a new vertex not existing in said graph prior to said modifying.

4. A method according to claim 1, wherein:
    said additional code, said first set of code and said graph are provided by a developer.

5. A method according to claim 1, wherein:
    said automatically modifying said graph based on executing said first set of code takes into account volume of data processed by said first set of code.

6. A method according to claim 1, further comprising:
    receiving one or more indications of one or more portions of said graph that are eligible to be modified, said automatically modifying said graph is restricted to said one or more portions based on said one or more indications.

7. A method according to claim 1, wherein:
    said graph is a directed acyclic graph.

8. One or more processor readable storage devices having processor readable code stored thereon, said processor readable code programs one or more processors to perform a method comprising:
    accessing a representation of a directed acyclic graph defining a parallel processing job, said graph having vertices and edges connecting to said vertices, said vertices represents sets of program code of said parallel processing job to be run on a distributed execution engine and edges represent data channels;
    automatically modifying said graph during runtime of said parallel processing job on said distributed execution engine based on runtime information of said parallel processing job on said distributed execution engine, wherein said automatically modifying comprises determining where a first set of vertices were executed in said distributed execution engine, grouping together vertices of said first set based on where they ran in said distributed execution engine, adding new vertices to each group and adding new edges for said new vertices, said ne vertices are copies of existing vertices; and
    assigning code corresponding to vertices of said graph to various nodes of said distributed parallel processing engine based on said graph.

9. One or more processor readable storage devices according to claim 8, wherein:
    said graph includes a first set of vertices at a first level of hierarchy in communication with a second set of vertices at a second level of hierarchy;
    said automatically modifying said graph includes grouping a first subset of said first set of vertices into a first group and grouping a second subset of said first set of vertices into a second group based on location and availability of nodes on said distributed execution engine; and
    said automatically modifying said graph further includes adding additional vertices of said second set of vertices to said first group.

10. One or more processor readable storage devices according to claim 9, wherein said method further comprises:
    receiving an indication of a portion of said graph that is eligible to be modified, said automatically modifying said graph is restricted to said portion based on said indication.

11. One or more processor readable storage devices according to claim 8, wherein said automatically modifying further comprises:
    recursively grouping vertices and adding new vertices.

12. One or more processor readable storage devices according to claim 8, wherein:
    said determining where a first set of vertices were executed in said distributed execution engine comprises determining that a subset of the first set of vertices were executed in a portion of said distributed execution engine associated with a first switch;
    said grouping includes grouping together the subset of the first set of vertices;
    the adding new vertices to each group includes adding a new vertex to said graph for the subset of the first set of vertices; and
    the method further comprises causing code for said new vertex to run in said portion of said distributed execution engine associated with said first switch.

13. One or more processor readable storage devices according to claim 12, wherein:
    said new vertex is a copy of an existing vertex.

14. A distributed parallel processing system, comprising:
    a network;

a plurality of computing machines connected to said network; and a job manager connected to said network and in communication with said computing machines, said job manager manages execution of a job defined by a user customizable graph, said user customizable graph includes a set of vertices corresponding to a set of program units and edges corresponding to data channels, said job manager assigns said program units for execution on said computing machines based on said graph;

said job manager automatically modifies said graph during runtime of said job based on topology of said network, availability of said computing machines and said vertices;

said job manager automatically modifies said graph by determining where a first set of vertices were executed in said network, grouping together vertices of said first set based on where they ran in said network; adding new vertices to the graph, and adding new edges for said new vertices;

the new vertices correspond to code from existing vertices.

15. A distributed parallel processing system according to claim 14, wherein:

said job manager only modifies one or more portions of said graph that are previously indicated by a user to be eligible for modification.

16. A distributed parallel processing system according to claim 14, further comprising:

a name server connected to said network and in communication with said job manager, said name server informs said job manager of identifications of said computing machines, said name server provides information to said job manager about topology of said network, said network is a tree-structured network.

* * * * *